United States Patent
Furutani

(10) Patent No.: US 9,671,887 B2
(45) Date of Patent: Jun. 6, 2017

(54) SENSOR-EQUIPPED DISPLAY DEVICE

(71) Applicant: Japan Display Inc., Tokyo (JP)

(72) Inventor: Naosuke Furutani, Tokyo (JP)

(73) Assignee: Japan Display Inc., Tokyo (JP)

( * ) Notice: Subject to any disclaimer, the term of this patent is extended or adjusted under 35 U.S.C. 154(b) by 34 days.

(21) Appl. No.: 14/737,951

(22) Filed: Jun. 12, 2015

(65) Prior Publication Data

US 2015/0363016 A1 Dec. 17, 2015

(30) Foreign Application Priority Data

Jun. 13, 2014 (JP) .................................. 2014-122108

(51) Int. Cl.
| | | |
|---|---|---|
| G06F 3/045 | (2006.01) | |
| G06F 3/041 | (2006.01) | |
| G09G 3/36 | (2006.01) | |
| G06F 3/044 | (2006.01) | |

(52) U.S. Cl.
CPC ............ G06F 3/0412 (2013.01); G06F 3/044 (2013.01); G06F 3/0416 (2013.01); G09G 3/36 (2013.01); G09G 2300/023 (2013.01); G09G 2300/0426 (2013.01)

(58) Field of Classification Search
CPC ...... G06F 3/0412; G06F 3/0416; G06F 3/044; G09G 3/36; G09G 2300/023; G09G 2300/0426
See application file for complete search history.

(56) References Cited

U.S. PATENT DOCUMENTS

| | | | | |
|---|---|---|---|---|
| 7,482,628 B2* | 1/2009 | Kang | .................. | G02F 1/13454 |
| | | | | 257/257 |
| 9,292,126 B2* | 3/2016 | Koito | .................... | G06F 3/0416 |
| 2011/0080353 A1* | 4/2011 | Kang | ...................... | G06F 3/044 |
| | | | | 345/173 |
| 2012/0274582 A1* | 11/2012 | Shih | ........................ | G06F 3/044 |
| | | | | 345/173 |
| 2013/0207914 A1* | 8/2013 | Nagata | ..................... | G06F 3/044 |
| | | | | 345/173 |
| 2014/0028616 A1* | 1/2014 | Furutani | ................. | G06F 3/044 |
| | | | | 345/174 |
| 2014/0043288 A1* | 2/2014 | Kurasawa | ............. | G06F 3/0412 |
| | | | | 345/174 |

FOREIGN PATENT DOCUMENTS

| | | |
|---|---|---|
| JP | 2012-242796 A | 12/2012 |
| JP | 2012-247542 A | 12/2012 |
| JP | 2014-041603 A | 3/2014 |

* cited by examiner

*Primary Examiner* — Andre Sasinowski
*Assistant Examiner* — Gerald Oliver
(74) *Attorney, Agent, or Firm* — Michael Best & Friedrich LLP

(57) ABSTRACT

According to one embodiment, a sensor-equipped display device includes a display panel, a first driver, and a second driver. The display panel includes a first electrode, a second electrode and a detection electrode. The first driver delivers a common driving signal to the first electrode and the second electrode at a time of display driving, and selectively writes a write signal to one of the first electrode and the second electrode at a time of sensing driving. The second driver reads, from the detection electrode, a read signal indicative of a variation of a sensor signal occurring between the one of the first electrode and the second electrode, on one hand, and the detection electrode, on the other hand, at the time of the sensing driving.

7 Claims, 15 Drawing Sheets

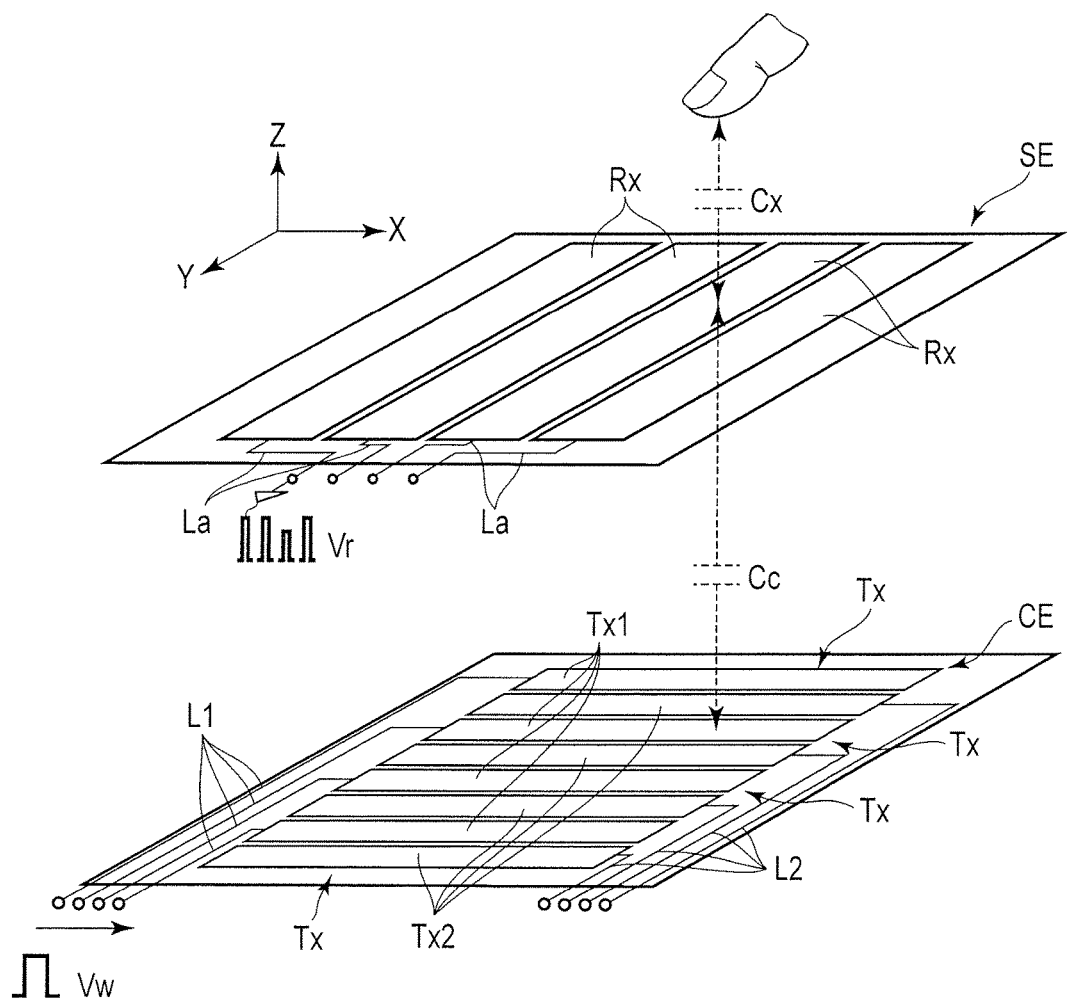
F I G. 6

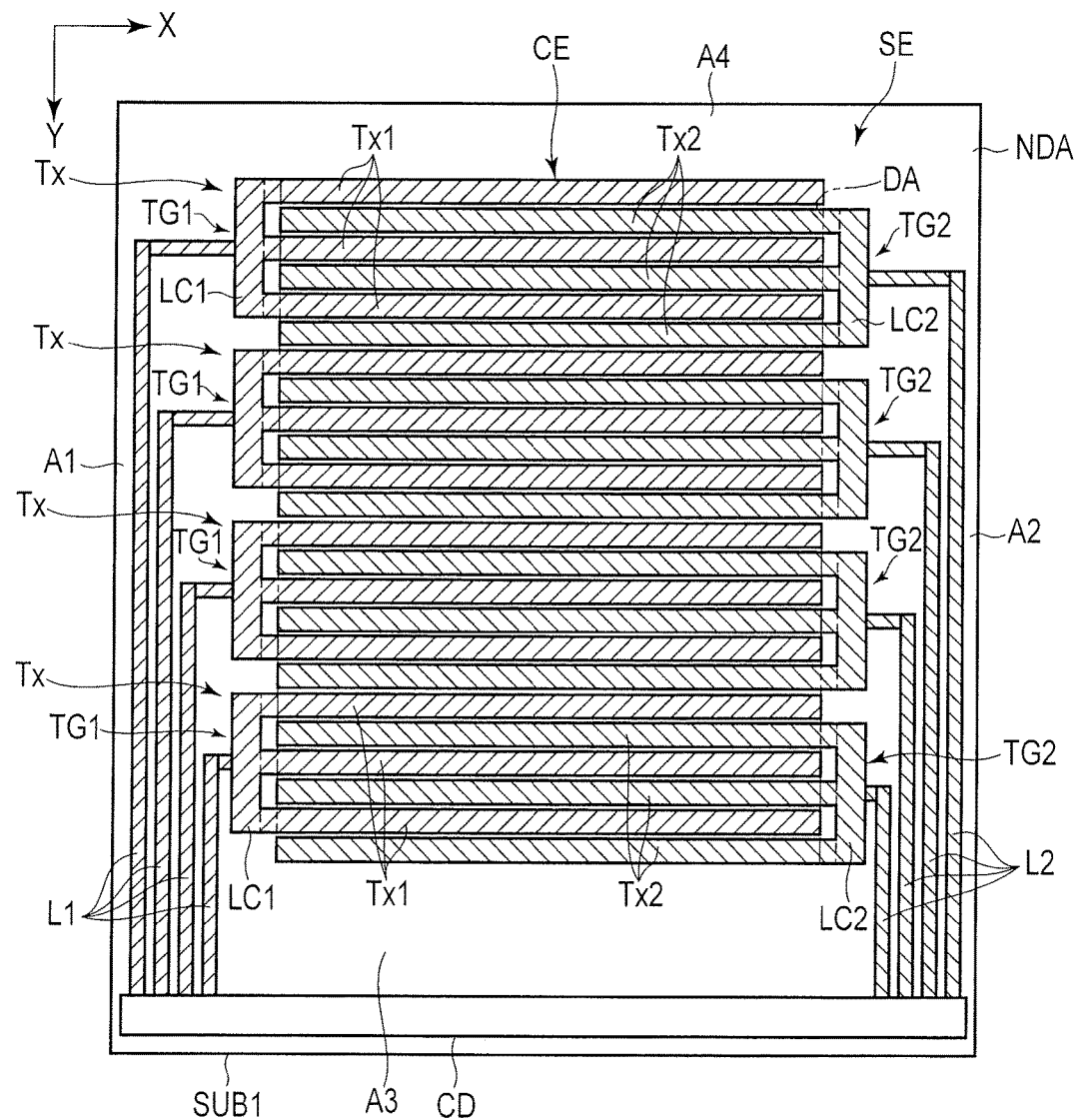
F I G. 9

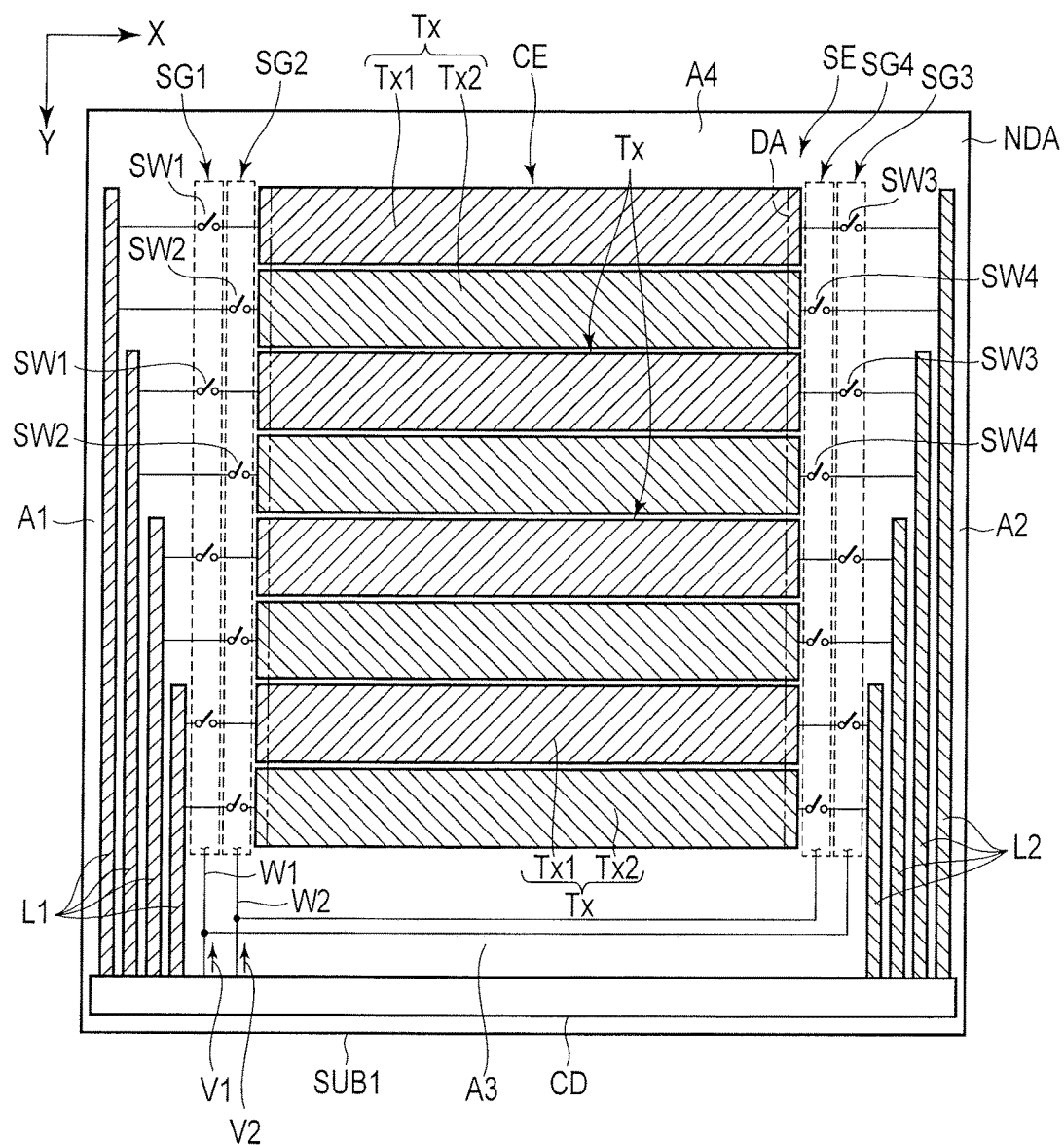
F I G. 10

SENSOR-EQUIPPED DISPLAY DEVICE

CROSS-REFERENCE TO RELATED APPLICATIONS

This application is based upon and claims the benefit of priority from Japanese Patent Application No. 2014-122108, filed Jun. 13, 2014, the entire contents of which are incorporated herein by reference.

FIELD

Embodiments described herein relate generally to a sensor-equipped display device.

BACKGROUND

In recent years, a sensor-equipped display device including a sensor (also called "touch panel" in some cases), which detects a contact or an approach of an object, has been put to practical use. As an example of the sensor, there is known an electrostatic capacitance-type sensor which detects a contact or an approach of a conductor, such as a finger, based on a variation in electrostatic capacitance. A detection electrode and a sensor driving electrode, which constitute such a sensor, are disposed in a display area which displays an image, and are opposed to each other via a dielectric. The detection electrode is electrically connected to a lead line which is located outside the display area.

BRIEF DESCRIPTION OF THE DRAWINGS

FIG. 6 is a view for explaining the principle of an example of a sensing method.

FIG. 9 is a plan view which schematically illustrates, in enlarged scale, a part of a first substrate of a sensor-equipped liquid crystal display device according to Modification 3 of the first embodiment.

FIG. 10 is a plan view which schematically illustrates, in enlarged scale, a part of a first substrate of a sensor-equipped liquid crystal display device according to Modification 4 of the first embodiment.

DETAILED DESCRIPTION

Figure 1:
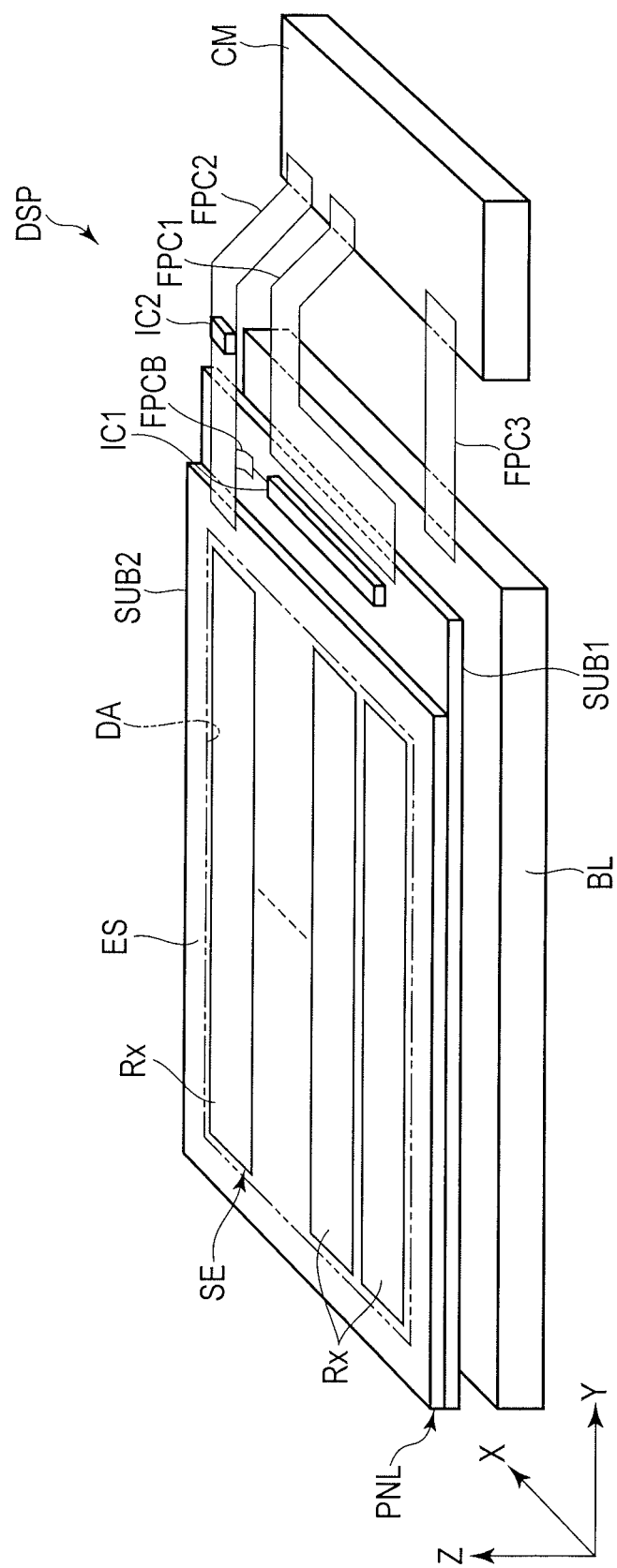
FIG. 1 is a perspective view which schematically illustrates the structure of a sensor-equipped liquid crystal display device according to a first embodiment.

In general, according to one embodiment, there is provided a sensor-equipped display device comprising: a display panel comprising a first electrode, a second electrode spaced apart from the first electrode and extending in parallel to the first electrode, and a detection electrode; a first driver configured to deliver a common driving signal to the first electrode and the second electrode at a time of display driving for displaying an image, and to selectively write a write signal to one of the first electrode and the second electrode at a time of sensing driving for executing sensing; and a second driver configured to read, from the detection electrode, a read signal indicative of a variation of a sensor signal occurring between the one of the first electrode and the second electrode, on one hand, and the detection electrode, on the other hand, at the time of the sensing driving.

According to another embodiment, there is provided a sensor-equipped display device comprising: a display panel comprising a first electrode group formed in a comb shape and including a plurality of first electrodes extending in a first direction in a display area which displays an image, and spaced apart from each other in a second direction crossing the first direction, and a first connection electrode provided in a first non-display area and connected to the first electrodes, a second electrode group formed in a comb shape and spaced apart from the first electrode group, the second electrode group including a plurality of second electrodes extending in the first direction in the display area and spaced apart from each other in the second direction, and a second connection electrode provided in a second non-display area on a side opposite to the first non-display area with the display area interposed, and connected to the second electrodes, and a detection electrode, the first electrodes and the second electrodes being alternately arranged in the second direction; a first driver configured to deliver a common driving signal to the first electrode group and the second electrode group at a time of display driving for displaying an image, and to selectively write a write signal to one of the first electrode group and the second electrode group at a time of sensing driving for executing sensing; and a second driver configured to read, from the detection electrode, a read signal indicative of a variation of a sensor signal occurring between the one of the first electrode group and the second electrode group, on one hand, and the detection electrode, on the other hand, at the time of the sensing driving.

Embodiments of the present invention will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference signs, and a detailed description thereof is omitted unless otherwise necessary.

To begin with, a structure, which is the basis of embodiments of the invention, is described.

A sensor-equipped display device includes a display panel and a sensor, and is configured to detect data which is input from a display surface side with use of input means. The sensor is an electrostatic capacitance-type sensor. As the input means, a conductor such as a pen or a human body can be used.

For example, the sensor is composed of a sensor driving electrode and a detection electrode. At a sensing driving time, a write signal is written to the sensor driving electrode, a sensor signal is generated between the sensor driving electrode and the detection electrode, and a read signal indicative of a variation of the sensor signal is read from the detection electrode. Thereby, the display device can detect position information of a location where the input means, such as a finger, has come in contact with, or has approached, an input surface of the display device.

With an increase in size of the screen of the display device, there is a tendency that the size (area) of the above-described driving electrode becomes larger. If the size of the sensor driving electrode becomes larger, the load of the sensor driving electrode increases, and such a problem arises that the time constant of the sensor driving electrode increases. There is a tendency that, as the time constant of the sensor driving electrode is larger, the time that is needed for sensing increases.

In order to solve this problem, in the embodiments of the invention, a sensor-equipped display device, which can reduce the time constant of the electrode for use in sensing, can be obtained. Next, the means and methods for solving the above problem will be described.

First Embodiment

Referring to the accompanying drawings, a detailed description is given of a sensor-equipped display device according to a first embodiment. FIG. 1 is a perspective view which schematically illustrates the structure of the sensor-equipped display device according to this embodiment. In this embodiment, the case in which the display device is a liquid crystal display device is described.

As illustrated in FIG. 1, a liquid crystal display device DSP includes an active-matrix-type liquid crystal display panel PNL, a driver IC chip IC1 which drives the liquid crystal display panel PNL, a sensor SE of an electrostatic capacitance type, a driver IC chip IC2 which drives the sensor SE, a backlight unit BL which illuminates the liquid crystal display panel PNL, a control module CM, flexible wiring boards FPC1, FPC2, FPC3, etc.

The liquid crystal display panel PNL includes a first substrate SUB1 having a flat plate shape, a second substrate SUB2 having a flat plate shape, which is disposed opposed to the first substrate SUB1 with a predetermined gap, and a liquid crystal layer (a liquid crystal layer LQ to be described later) which is held between the first substrate SUB1 and second substrate SUB2. Incidentally, in this embodiment, the first substrate SUB1 can be restated as an array substrate, and the second substrate SUB2 can be restated as a counter-substrate. The liquid crystal display panel PNL includes a display area (active area) DA which displays an image. The liquid crystal display panel PNL is a transmissive liquid crystal display panel with a transmissive display function of displaying an image by selectively transmitting light from the backlight unit BL. Incidentally, the liquid crystal display panel PNL may be a reflective liquid crystal display panel with a reflective display function of displaying an image by selectively reflecting light from the front surface, such as ambient light or fill light. Besides, the liquid crystal display panel PNL may be a transflective liquid crystal display having both the transmissive display function and the reflective display function.

The backlight unit BL is disposed on a back surface side of the first substrate SUB1. As this backlight unit BL, various modes are applicable. In addition, the backlight unit BL can utilize various light sources, such as a light-emitting diode (LED) or a cold cathode fluorescent lamp (CCFL). A description of the detailed structure of the light source is omitted. Incidentally, in the case where the liquid crystal display panel PNL is a reflective type having only the reflective display function, the backlight unit BL is omitted.

The sensor SE includes a plurality of detection electrodes Rx. These detection electrodes Rx are provided, for example, above an external surface ES on that screen side of the liquid crystal display panel PNL, which displays an image. Thus, the detection electrodes Rx may be in contact with the external surface ES, or may be positioned apart from the external surface ES. In the latter case, a member, such as an insulation film, is interposed between the external surface ES and the detection electrodes Rx. In the present embodiment, the detection electrodes Rx are in contact with the external surface ES. In this case, the external surface ES is that one of a pair of planar surfaces of the second substrate SUB2, which is opposite to the planar surface facing the first substrate SUB1, and the external surface ES includes a display surface which displays an image. In addition, in the example illustrated, the respective detection electrodes Rx extend substantially in a column direction Y, and are arranged in a row direction X crossing the column direction Y. A thickness direction Z of the liquid crystal display panel PNL is perpendicular to each of the row direction X and column direction Y. In the present embodiment, the row direction X is a first direction, the column direction Y is a second direction, and the thickness direction Z is a third direction. Incidentally, the respective detection electrodes Rx may extend in the row direction X and may be arranged in the column direction Y, or may be formed in island shapes and may be arranged in a matrix in the row direction X and column direction Y. In this example, the row direction X and column direction Y are perpendicular to each other. However, the row direction X and column direction Y may cross at an angle other than 90°.

The driver IC chip IC1 functioning as a first driver is mounted on the first substrate SUB1 of the liquid crystal display panel PNL. The flexible wiring board FPC1 connects the liquid crystal display panel PNL with the control module CM. The flexible wiring board FPC2 connects the detection electrodes Rx of the sensor SE with the control module CM. The driver IC chip IC2 functioning as a second driver is mounted on the flexible wiring board FPC2. The flexible wiring board FPC3 connects the backlight unit BL with the control module CM. In this case, the control module CM can be restated as an application processor.

The driver IC chip IC1 and driver IC chip IC2 are connected via the flexible wiring board FPC2, etc. For example, in the case where the flexible wiring board FPC2 includes a branch portion FPCB which is connected onto the first substrate SUB1, the driver IC chip IC1 and driver IC chip IC2 may be connected via wiring lines on the branch portion FPCB and first substrate SUB1. In addition, the driver IC chip IC1 and driver IC chip IC2 may be connected via the flexible wiring boards FPC1 and FPC2.

One of the driver IC chip IC1 and driver IC chip IC2 can generate a timing signal, which indicates the timing of driving of the sensor SE, and can deliver this timing signal to the other driver IC chip. Alternatively, one of the driver IC chip IC1 and driver IC chip IC2 can generate a timing signal, which indicates the timing of driving of a common electrode CE (to be described later), and can deliver this timing signal to another driver IC chip. Alternatively, the control module CM can deliver timing signals to the driver IC chips IC1 and IC2. By the timing signals, the driving of the driver IC chip IC1 and the driving of the driver IC chip IC2 can be synchronized.

Figure 2:
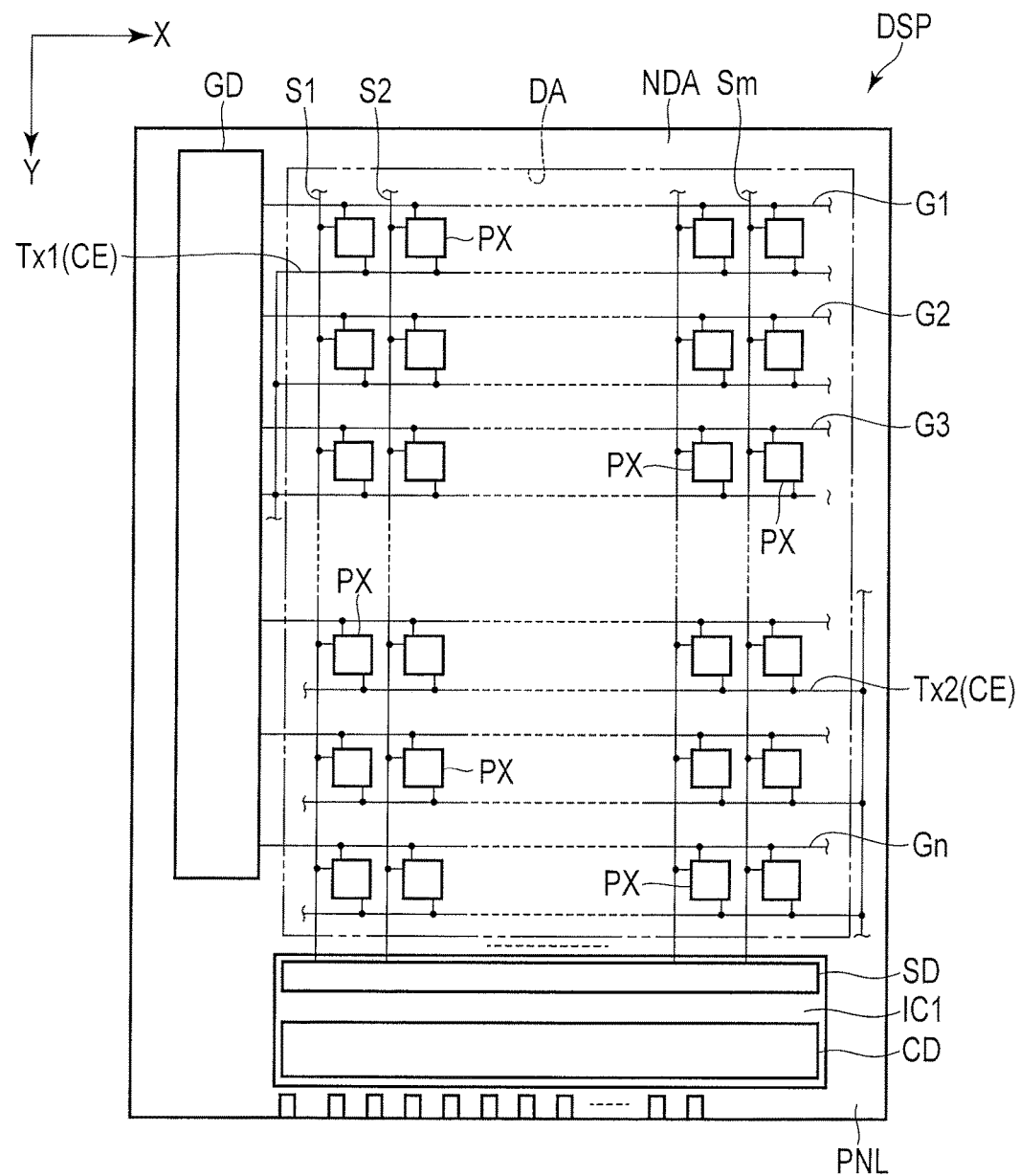
FIG. 2 is a view which schematically illustrates a basic structure and an equivalent circuit of a liquid crystal display device shown in FIG. 1.

FIG. 2 is a view illustrating a basic structure and an equivalent circuit of the liquid crystal display device DSP shown in FIG. 1.

As illustrated in FIG. 2, the liquid crystal display device DSP includes, in addition to the liquid crystal display panel PNL, etc., the driver IC chip IC1, a gate line driving circuit GD, etc., which are located in a non-display area NDA on the outside of the display area DA. In the embodiment, the driver IC chip IC1 includes a source line driving circuit SD and a common electrode driving circuit CD. The driver IC chip IC1 may include at least parts of the source line driving circuit SD and common electrode driving circuit CD. The shape of the non-display area NDA is a picture frame shape surrounding the display area DA.

The liquid crystal display panel PNL includes a plurality of pixels PX in the display area DA. The pixels PX are disposed in a matrix in the row direction X and column direction Y, and the number of pixels PX is m×n (m and n are positive integer numbers). In addition, the liquid crystal display panel PNL includes, in the display area DA, an n-number of gate lines G (G1 to Gn), an m-number of source lines S (S1 to Sm) and a common electrode CE.

The gate lines G extend substantially linearly in the row direction X, are led out to the outside of the display area DA, and are connected to the gate line driving circuit GD. In addition, the gate lines G are spaced apart and arranged in the column direction Y. The source lines S extend substantially linearly in the column direction Y, are led out to the outside of the display area DA, and are connected to the source line driving circuit SD. In addition, the source lines S are spaced apart and arranged in the row direction X, and cross the gate lines G. In the meantime, the gate lines G and source lines S may not necessarily extend linearly, and portions thereof may be bent. The common electrode CE is provided at least in the display area DA, and is electrically connected to the common electrode driving circuit CD. The common electrode CE includes a plurality of first electrodes Tx1 and a plurality of second electrodes Tx2. Each of the first electrodes Tx1 and second electrodes Tx2 is shared by the pixels PX. Each pixel PX utilizes either the first electrode Tx1 or the second electrode Tx2. The details of the common electrode CE will be described later.

Figure 3:
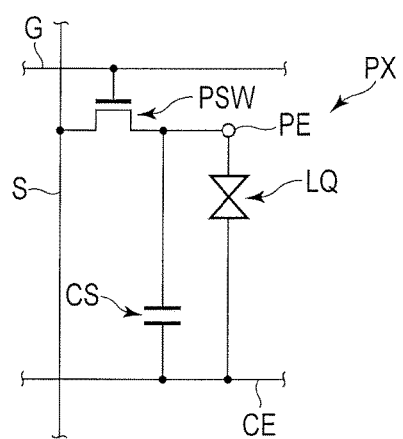
FIG. 3 is an equivalent circuit diagram illustrating a pixel shown in FIG. 2.

FIG. 3 is an equivalent circuit diagram illustrating the pixel PX shown in FIG. 2.

As illustrated in FIG. 3, each pixel PX includes a pixel switching element PSW, a pixel electrode PE, a common electrode CE, and a liquid crystal layer LQ. The pixel switching element PSW is formed of, for example, a thin-film transistor. The pixel switching element PSW is electrically connected to the gate line G and source line S. The pixel switching element PSW may be either a top-gate type or a bottom-gate type. In addition, although a semiconductor layer of the pixel switching element PSW is formed of, for example, polysilicon, the semiconductor layer may be formed of amorphous silicon or an oxide semiconductor. The pixel electrode PE is electrically connected to the pixel switching element PSW. The pixel electrode PE is opposed to the common electrode CE. The common electrode CE, an insulation film and pixel electrode PE form a storage capacitance CS.

Figure 4:
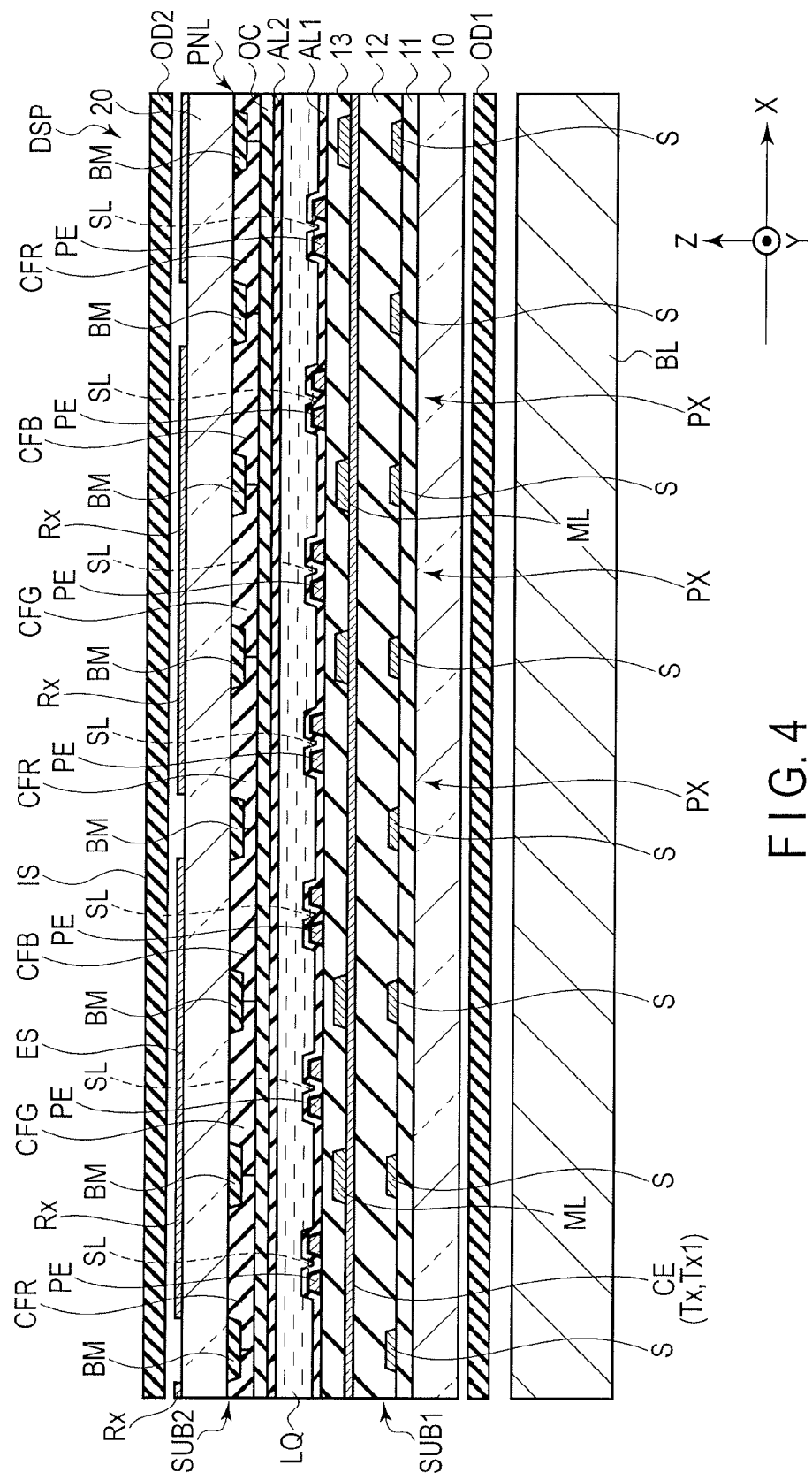
FIG. 4 is a cross-sectional view which schematically illustrates the structure of a part of the liquid crystal display device.

FIG. 4 is a cross-sectional view which schematically illustrates the structure of a part of the liquid crystal display device DSP.

Specifically, the liquid crystal display device DSP includes a first optical element OD1 and a second optical element OD2, in addition to the above-described liquid crystal display panel PNL and backlight unit BL. Although the illustrated liquid crystal display panel PNL has a structure that is adaptive to an FFS (Fringe Field Switching) mode as a display mode, it may have a structure adaptive to some other display mode. For example, the liquid crystal display panel PNL may have a structure that is adaptive to an IPS (In-Plane Switching) mode which mainly utilizes a lateral electric field that is substantially parallel to the substrate major surface. In the display mode utilizing the lateral electric field, for example, a structure, in which both the pixel electrode PE and common electrode CE are provided on the first substrate SUB1, is applicable. Alternatively, the liquid crystal display panel PNL may have a structure that is adaptive to a display mode which mainly utilizes a vertical electric field that is generated in a direction crossing the substrate major surface, such as a TN (Twisted Nematic) mode, an OCB (Optically Compensated Bend) mode or a VA (Vertical Aligned) mode. In the display mode utilizing the vertical electric field, for example, a structure, in which the pixel electrode PE is provided on the first substrate SUB1 and the common electrode CE is provided on the second substrate SUB2, or a structure in which these electrodes are transposed, is applicable. Incidentally, the substrate major surface, in this context, refers to a surface which is parallel to an X-Y plane defined by the row direction X and column direction Y which are perpendicular to each other.

The liquid crystal display panel PNL includes the first substrate SUB1, second substrate SUB2 and liquid crystal layer LQ. The first substrate SUB1 and second substrate SUB2 are bonded in a state in which a predetermined gap is created therebetween. The liquid crystal layer LQ is sealed in the gap between the first substrate SUB1 and second substrate SUB2.

The first substrate SUB1 is formed by using a first insulative substrate 10 with light transmissivity, such as a glass substrate or a resin substrate. The first substrate SUB1 includes gate lines G, pixel switching elements PSW, source lines S, a common electrode CE, pixel electrodes PE, a first insulation film 11, a second insulation film 12, a third insulation film 13, and a first alignment film AL1, on that side of the first insulative substrate 10, which is opposed to the second substrate SUB2.

The first insulation film 11 is disposed on the first insulative substrate 10. Although not described in detail, in the present embodiment, pixel switching elements of, for example, a top gate structure are applied. In this embodiment, the first insulation film 11 includes a plurality of insulation layers which are stacked in the thickness direction Z. For example, the first insulation film 11 includes various insulation layers, such as an undercoat layer lying between the first insulative substrate 10 and the semiconductor layer of the pixel switching element; a gate insulation layer lying between the semiconductor layer and the gate electrode; and an interlayer insulation layer lying between the gate electrode and a plurality of electrodes including a source electrode and a drain electrode. Like the gate electrode, the gate line is disposed between the gate insulation layer and the interlayer insulation layer. The source lines S are formed on the first insulation film 11. In addition, the source electrodes and drain electrodes of the pixel switching elements are formed on the first insulation film 11. In the example illustrated, the source lines S extend in the column direction Y.

The second insulation film 12 is disposed on the source lines S and first insulation film 11. The common electrode CE is formed on the second insulation film 12. The common electrode CE includes a plurality of sensor driving electrodes Tx. The common electrode CE is formed of a transparent, electrically conductive material such as indium tin oxide (ITO), indium zinc oxide (IZO) or zinc oxide (ZnO). Incidentally, in the example illustrated, metal layers ML are formed on the first electrodes Tx1 of the common electrode CE, and the resistance of the first electrode Tx1 is decreased. In this case, the metal layers ML are also formed on the second electrodes Tx2 of the common electrode CE. However, the metal layers ML may be omitted.

The third insulation film 13 is disposed on the common electrode CE and second insulation film 12. The pixel electrodes PE are formed on the third insulation film 13. Each pixel electrode PE is located between the source lines S which are spaced apart from each other in the row direction X, and is opposed to the common electrode CE. To be more specific, each pixel electrode PE is opposed to at least one of the first electrode Tx1 and second electrode Tx2. In addition, each pixel electrode PE includes a slit SL at a position opposed to the common electrode CE. Such pixel electrodes PE are formed of, for example, a transparent, electrically conductive material such as ITO or IZO. The first alignment film AL1 covers the pixel electrodes PE and third insulation film 13.

On the other hand, the second substrate SUB2 is formed by using a second insulative substrate 20 with light transmissivity, such as a glass substrate or a resin substrate. The second substrate SUB2 includes a black matrix BM, color filters CFR, CFG, CFB, an overcoat layer OC, and a second alignment film AL2, on that side of the second insulative substrate 20, which is opposed to the first substrate SUB1.

The black matrix BM is formed on an inner surface of the second insulative substrate 20 and partitions the respective pixels. The color filters CFR, CFG, CFB are formed on the inner surface of the second insulative substrate 20, and parts thereof overlap the black matrix BM. The color filter CFR is a red color filter which is disposed in a red pixel and is formed of a red resin material. The color filter CFG is a green color filter which is disposed in a green pixel and is formed of a green resin material. The color filter CFB is a blue color filter which is disposed in a blue pixel and is formed of a blue resin material. The example illustrated corresponds to the case in which a unit pixel, which is a minimum unit constituting a color image, is composed of three color pixels, namely a red pixel, a green pixel and a blue pixel. However, the unit pixel is not limited to the combination of the three color pixels. For example, the unit pixel may be composed of four color pixels, with a white pixel being added to the red pixel, green pixel and blue pixel. In this case, a white color filter or transparent color filter may be disposed in the white pixel, or the filter itself of the white pixel may be omitted. The overcoat layer OC covers the color filters CFR, CFG, CFB. The overcoat layer OC is formed of a transparent resin material. The second alignment film AL2 covers the overcoat layer OC.

Detection electrodes Rx are formed above a front surface (external surface ES) of the second insulative substrate 20. The detailed structure of the detection electrode Rx will be described later. In this embodiment, the detection electrode Rx may be formed of a transparent, electrically conductive material such as ITO or IZO. Incidentally, the detection electrodes Rx may be formed of a plurality of metallic thin wires of, e.g. about 2 to 5 μm, as electrically conductive material. By decreasing the electrical resistance value of the detection electrode Rx, the time that is needed for detection can be shortened. Thus, to form the detection electrodes Rx of metal thin wires is advantageous in increasing the size and fineness of the liquid crystal display panel PNL. Alternatively, the detection electrode Rx may be formed of a combination (aggregation) of a metal (e.g. thin metal wire) and a transparent, electrically conductive material (e.g. transparent conductive layer). Each detection electrode Rx is opposed to the common electrode CE through dielectrics such as the third insulation film 13, first alignment film AL1, liquid crystal layer LQ, second alignment film AL2, overcoat layer OC, color filters CFR, CFG and CFB, and second insulative substrate 20.

The first optical element OD1 is disposed between the first insulative substrate 10 and backlight unit BL. The second optical element OD2 is disposed above the detection electrodes Rx. Each of the first optical element OD1 and second optical element OD2 includes at least a polarizer, and may also include a retardation plate, where necessary. The absorption axis of the polarizer included in the first optical element OD1 and the absorption axis of the polarizer included in the second optical element OD2 are perpendicular to each other. In addition, in this example, an input surface IS of the liquid crystal display device DSP is the surface of the second optical element OD2. The liquid crystal display device DSP can detect position information of a location where a finger or the like has come in contact with, or has approached, the input surface IS of the liquid crystal display device DSP.

Next, a description is given of an operation at a display driving time for displaying an image in the above-described FFS-mode liquid crystal display device DSP.

To begin with, an OFF state, in which no fringe electric field is produced in the liquid crystal layer LQ, is described. The OFF state corresponds to a state in which no potential difference is produced between the pixel electrode PE and common electrode CE. In this OFF state, the liquid crystal molecules included in the liquid crystal layer LQ are initially aligned in one direction in the X-Y plane by an alignment restriction force of the first alignment film AL1 and second alignment film AL2. Part of light from the backlight unit BL passes through the polarizer of the first optical element OD1, and enters the liquid crystal display panel PNL. The light, which enters the liquid crystal display panel PNL, is linearly polarized light which is perpendicular to the absorption axis of the polarizer. The polarization state of such linearly polarized light hardly varies when the light passes through the liquid crystal display panel PNL in the OFF state. Thus, most of the linearly polarized light, which has passed through the liquid crystal display panel LPN, is absorbed by the polarizer of the second optical element OD2 (black display). As a result, the light from the backlight unit BL does not pass through the liquid crystal display panel, and black display is effected on the display area. A mode, in which black display is effected on the liquid crystal display panel PNL in the OFF state, is called "normally black mode".

Then, an ON state, in which a fringe electric field is produced in the liquid crystal layer LQ, is described. The ON state corresponds to a state in which a potential difference is produced between the pixel electrode PE and common electrode CE. Specifically, a common driving signal (common voltage) is supplied to the common electrode CE from the common electrode driving circuit CD. On the other hand, such a video signal as to produce a potential difference relative to the common voltage, which is a constant voltage, is supplied to the pixel electrode PE. Thereby, in the ON state, a fringe electric field is produced between the pixel electrode PE and common electrode CE.

In this ON state, the liquid crystal molecules are aligned in an azimuth direction in the X-Y plane, which is different from the initial alignment direction, by being affected by the fringe electric field produced in the liquid crystal layer. In the ON state, linearly polarized light, which is perpendicular to the absorption axis of the polarizer of the first optical element OD1, enters the liquid crystal display panel LPN, and the polarization state thereof varies depending on the alignment state of liquid crystal molecules when the light passes through the liquid crystal layer LQ. Thus, in the ON state, at least part of the light, which has passed through the liquid crystal layer LQ, passes through the polarizer of the second optical element OD2 (white display).

Figure 5:
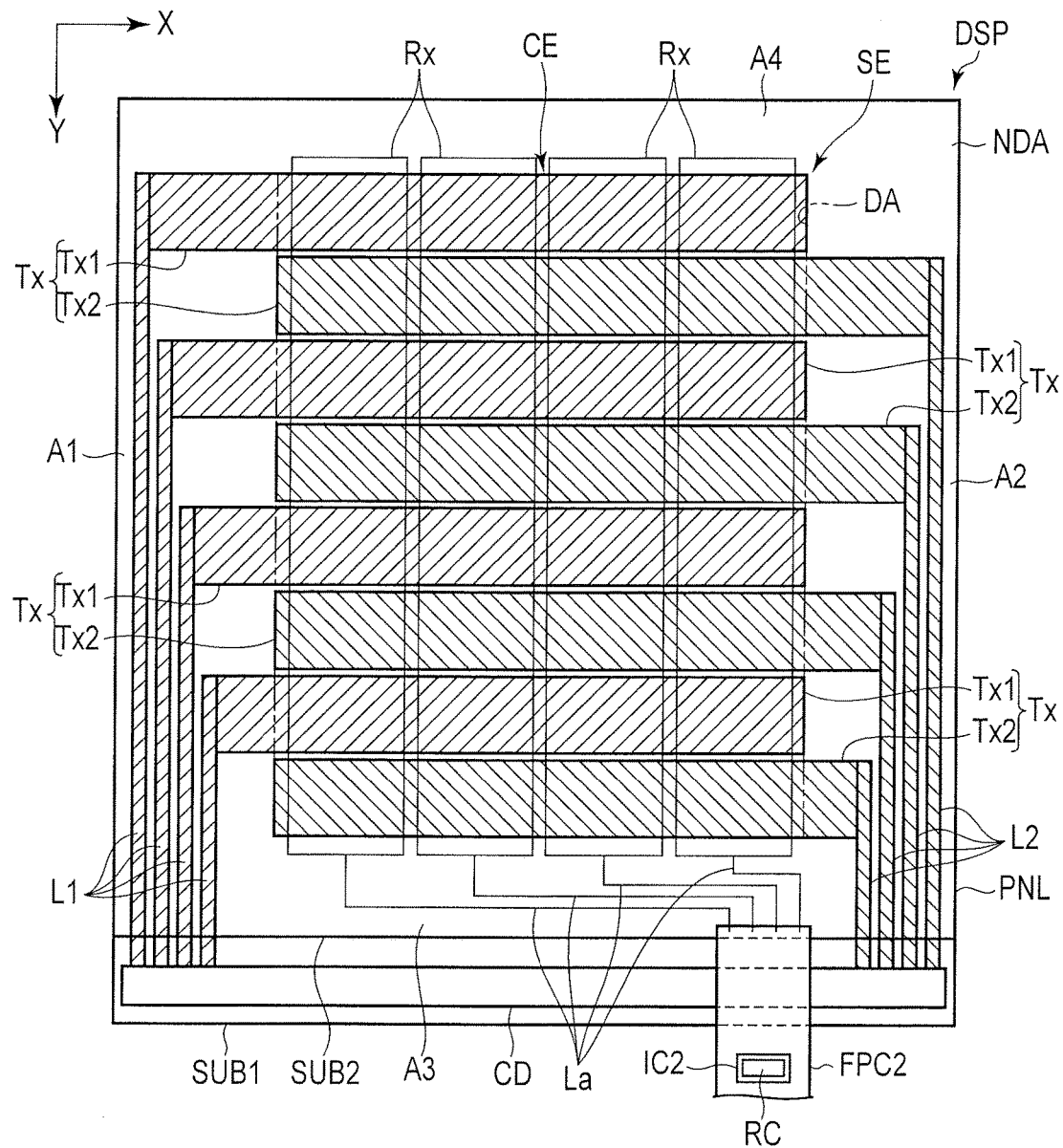
FIG. 5 is a plan view which schematically illustrates the structure of a sensor in the first embodiment.

Next, the sensor SE of the electrostatic capacitance type, which is included in the liquid crystal display device DSP of this embodiment, is described. FIG. 5 is a plan view which schematically illustrates the structure of the sensor SE in the embodiment. In FIG. 5, although depiction of the above-described driving IC chip IC1 is omitted, the common electrode driving circuit CD is provided in the driving IC chip IC1, as described above.

As illustrated in FIG. 5, the sensor SE of the embodiment includes a common electrode CE on the first substrate SUB1 side, detection electrodes Rx, first lead lines L1 and second lead lines L2 on the second substrate SUB2 side. Specifically, the common electrode CE functions as an electrode for display, and also functions as a sensor driving electrode.

The common electrode CE and detection electrodes Rx are disposed at least in the display area DA. The common electrode CE includes a plurality of band-shaped first electrodes Tx1 and a plurality of band-shaped second electrodes Tx2. In the example illustrated, the first electrodes Tx1 and second electrodes Tx2 extend, in the display area DA, substantially linearly in the row direction X, are spaced apart and arranged in the column direction Y, and are formed in band shapes. The first electrodes Tx1 and second electrodes Tx2 are alternately arranged in the column direction Y.

One first electrode Tx1 and one second electrode Tx2, which neighbor in the column direction Y, form a sensor driving electrode Tx. In the display area DA, the sensor driving electrode Tx is formed in a band-shaped area. The first electrode Tx1 and second electrode Tx2 of the sensor driving electrode Tx are spaced apart from each other, and extend in parallel to each other. In the display area DA, an area of the first electrode Tx1 and an area of the second electrode Tx2 of the sensor driving electrode Tx are substantially equal. In this case, the first electrode Tx1 and second electrode Tx2 are formed in a manner to halve the sensor driving electrode Tx in the column direction Y.

In this embodiment, the display area DA has a rectangular shape, and the non-display area NDA has a rectangular frame shape. It is now assumed that, of the non-display area NDA, a left side of the first substrate SUB1 is a first non-display area A1 (a band-shaped area extending in the column direction Y), a right side of the first substrate SUB1 is a second non-display area A2 (a band-shaped area extending in the column direction Y), a lower side of the first substrate SUB1 is a third non-display area A3 (a band-shaped area extending in the row direction X), and a upper side of the first substrate SUB1 is a fourth non-display area A4 (a band-shaped area extending in the row direction X).

The first electrode Tx1 is provided over the first non-display area A1 and display area DA. The second electrode Tx2 is provided over the display area DA and second non-display area A2.

Incidentally, the number, size and shape of the first electrodes Tx1 and second electrodes Tx2 are not specifically limited, and are variously changeable. For example, the width in the column direction Y of each of the first electrode Tx1 and second electrode Tx2 is not specifically limited and is variously modifiable, and it should suffice if the first electrode Tx1 and second electrode Tx2 are shared by a plurality of rows of pixels PX. In addition, as in examples to be described later, the first electrode Tx1 and second electrode Tx2 may be spaced apart and arranged in the row direction X and may extend substantially linearly in the column direction Y.

In addition, in the present embodiment, for the purpose of convenience, a description is given on the assumption that the common electrode CE includes four sensor driving electrodes Tx. However, the number of sensor driving electrodes Tx is not specifically limited, and is variously changeable. The common electrode CE may include a plurality of, other than four, sensor driving electrodes Tx.

The first lead lines L1 are provided in the first non-display area A1 and third non-display area A3 of the first substrate SUB1, and connect the first electrodes Tx1 with the common electrode driving circuit CD. The second lead lines L2 are provided in the second non-display area A2 and third non-display area A3 of the first substrate SUB1, and connect the second electrodes Tx2 with the common electrode driving circuit CD.

The first lead lines L1 and second lead lines L2 are formed of a transparent, electrically conductive material such as ITO or IZO. In this embodiment, the first lead lines L1 are formed of ITO and formed integral with the first electrodes Tx1, and the second lead lines L2 are formed of ITO and formed integral with the second electrodes Tx2.

Incidentally, the first lead lines L1 and second lead lines L2 may be formed of, for example, a metal as an electrically conductive material. For example, in the case where the liquid crystal display panel PNL uses the metal layers ML shown in FIG. 4, the first lead lines L1, second lead lines L2 and metal layers ML can be formed at the same time by using the same metallic material.

In the present embodiment, the common electrode driving circuit CD functions as a first driving unit. At a display driving time for displaying an image, the common electrode driving circuit CD delivers a common driving signal to the first electrode Tx1 and second electrode Tx2 of the sensor driving electrode Tx. At a sensing driving time for executing sensing, the common electrode driving circuit CD selectively writes a write signal to one the first electrode Tx1 and the second electrode Tx2 of the sensor driving electrode Tx.

In this embodiment, although the common electrode driving circuit CD is provided in the third non-display area A3 of the first substrate SUB1, the common electrode driving circuit CD is not limited to this example and is variously modifiable.

For example, the common electrode driving circuit CD may be provided in the first non-display area A1 of the first substrate SUB1. In this case, the first lead lines L1 and second lead lines L2 are provided in the first non-display area A1.

Alternatively, in place of the common electrode driving circuit CD, a first common electrode driving circuit may be provided in the first non-display area A1 of the first substrate SUB1, and a second common electrode driving circuit may be provided in the second non-display area A2 of the first substrate SUB1. In this case, for example, the first lead lines L1 are provided in the first non-display area A1 and connect the first electrodes Tx1 with the first common electrode driving circuit. The second lead lines L2 are provided in the second non-display area A2 and connect the second electrodes Tx2 with the second common electrode driving circuit.

The detection electrodes Rx are spaced apart and arranged in the row direction X in the display area DA, and extend substantially linearly in the column direction Y. Specifically, in this embodiment, the detection electrodes Rx extend in a direction crossing the sensor driving electrodes Tx. As described above, the detection electrodes Rx according to this embodiment are formed of a transparent, electrically conductive material, such as ITO or IZO. The common electrode CE (first electrodes Tx1 and second electrodes Tx2 extending in the row direction X) and the detection electrodes Rx extending in the column direction Y are opposed to each other, with various dielectrics being interposed, as described above.

Incidentally, the number, size and shape of the detection electrodes Rx are not specifically limited, and are variously changeable. In addition, as in examples to be described later, when the first electrodes Tx1 and second electrodes Tx2 extend substantially linearly in the column direction Y, the detection electrodes Rx may be spaced apart from each other in the column direction Y and may extend substantially linearly in the row direction X.

Lead lines La are provided above the external surface ES of the liquid crystal display panel PNL in the non-display area NDA, and are connected to the detection electrodes Rx. In this example, the lead lines La are electrically connected to the detection electrodes Rx in a one-to-one correspondence. In addition, in the non-display area NDA, the lead lines La are connected to OLB (Outer Lead Bonding) pads which are disposed above the external surface ES of the liquid crystal display panel PNL. The flexible wiring board FPC2 is connected to the OLB pads. The lead lines La are connected to the driver IC chip IC2 via the OLB pads and flexible wiring board FPC2. Each of the lead lines La outputs a sensor output value from the detection electrode Rx.

The lead lines La are formed of a metal or a transparent, electrically conductive material, as an electrically conductive material. By forming the lead line La of a metallic material having a much lower electrical resistance value than a transparent, electrically conductive material, the width of the lead line La can be decreased. Since the OLB pads can be densely disposed at one location of the second substrate SUB2, the size and cost of the flexible wiring board FPC2 can be reduced.

In the present embodiment, the driver IC chip IC2 functions as a second driver. At a sensing driving time for executing sensing, the driver IC chip IC2 reads, from the detection electrode Rx, a read signal indicative of a variation of a sensor signal which is generated between one of the first electrode Tx1 and second electrode Tx2 of the sensor driving electrode Tx, and the detection electrode Rx.

A detection circuit RC is incorporated in, for example, the driver IC chip IC2. This detection circuit RC detects a contact of a conductor with the input surface IS of the liquid crystal display device DSP, or an approach of the conductor to the input surface IS, based on a read signal (sensor output value) from the detection electrode Rx. Furthermore, the detection circuit RC can detect position information of a location where the conductor has come in contact with, or has approached, the input surface IS. Incidentally, the detection circuit RC may be included in the control module CM.

Next, a description is given of an operation at a sensing driving time for executing sensing for detecting a contact or approach of a conductor with or to the input surface IS of the above-described liquid crystal display device DSP. Specifically, a write signal is selectively written to either the first electrode Tx1 or second electrode Tx2 of the sensor driving electrode Tx from the common electrode driving circuit CD. In this state, sensing by the sensor SE is executed.

Referring now to FIG. 6, the principle of an example of the sensing method is explained.

As illustrated in FIG. 6, the detection electrodes Rx are provided at least in the display area DA, and a sensor signal is generated between the detection electrode Rx and either of the first electrode Tx1 and second electrode Tx2 of the sensor driving electrode Tx. A capacitance Cc is present between the first electrode Tx1 and detection electrode Rx, or between the second electrode Tx2 and detection electrode Rx. Specifically, the detection electrode Rx is capacitive-coupled to the first electrode Tx1 and second electrode Tx2.

A pulse-shaped write signal (sensor driving signal) Vw is successively written to either the first electrode Tx1 or second electrode Tx2 at predetermined cycles. In this example, the write signal Vw is successively written to only the first electrode Tx1 of each sensor driving electrode Tx. In addition, it is assumed that the user's finger exists in close proximity to a position where a specific detection electrode Rx and a sensor driving electrode Tx intersect. A capacitance Cx is produced by the user's finger that is in close proximity to the detection electrode Rx.

When the pulse-shaped write signal Vw has been written to the first electrode Tx1, a pulse-shaped read signal (sensor output value) Vr having a lower level than pulses, which are obtained from other detection electrodes, is obtained from the specific detection electrode Rx. Specifically, when input position information, which is position information of the user's finger in the display area DA, is detected, the driver IC chip IC1 (common electrode driving circuit CD) functioning as the first driver writes the write signal Vw to only the first electrode Tx1, and causes a sensor signal to occur between the first electrode Tx1 and the detection electrode Rx. The driver IC chip IC2 functioning as the second driver is connected to the detection electrode Rx, and reads a read signal Vr indicative of a variation of the sensor signal (e.g. electrostatic capacitance occurring in the detection electrode Rx).

In the detection circuit RC shown in FIG. 5, two-dimensional position information of the finger in the X-Y plane of the sensor SE can be detected, based on the timing of write of the write signal Vw to the first electrode Tx1 of each sensor driving electrode Tx and the read signal Vr from each detection electrode Rx. In addition, the above-described capacitance Cx differs between a case in which the finger is near the detection electrode Rx and a case in which the finger is far from the detection electrode Rx. Accordingly, the level of the read signal Vr differs between a case in which the finger is near the detection electrode Rx and a case in which the finger is far from the detection electrode Rx. Thus, in the detection circuit RC, the degree of close proximity (the distance in the normal direction of the sensor SE) of the finger to the sensor SE can also be detected based on the level of the read signal Vr.

The above-described display driving and sensing driving are performed, for example, in one frame period. In an example, one frame period is divided into a first period and a second period. In the first period, display driving is executed in which video signals are written to all pixels of the display area DA in a time division manner (display period). In the second period following the first period, sensing driving is executed in which the to-be-detected object is detected over the entirety of the display area DA (touch detection period, or sensing period).

In another example, one frame period is further divided into a plurality of periods. In addition, the display area DA is divided into a plurality of blocks, and display driving and sensing driving are executed in units of a block. Specifically, in a first period of one frame period, first display driving is executed in which video signals are written in pixels of a first display block of the display area DA. In a second period following the first period, first sensing driving is executed in which the to-be-detected object (conductor) is detected in a first sensing block of the display area DA. The first sensing block and the first display block may be the same area, or may be different areas. In a third period following the second period, second display driving is executed in which video signals are written in pixels of a second display block, which is different from the first display block. In a fourth period following the third period, second sensing driving is executed in which the to-be-detected object is detected in a second sensing block which is different from the first sensing block. In this manner, it is possible to alternately execute display driving and sensing driving in one frame period, and to detect the to-be-detected object over the entirety of the display area DA, while writing video signals to all pixels of the display area DA.

According to the sensor-equipped liquid crystal display device DSP of the present embodiment with the above-described structure, the liquid crystal display device DSP includes the liquid crystal display panel PNL, the driver IC chip IC1 (common electrode driving circuit CD) functioning as the first driver, and the driver IC chip IC2 functioning as the second driver. The liquid crystal display panel PNL includes the first electrode Tx1, the second electrode Tx2 which is spaced apart from the first electrode Tx1 and extends in parallel to the first electrode Tx1, and the detection electrode Rx. The first electrode Tx1 and second electrode Tx2, which neighbor in the column direction Y, constitute the sensor driving electrode Tx.

At the display driving time, the common electrode driving circuit CD delivers a common driving signal to the first electrode Tx1 and second electrode Tx2. At the sensing driving time for executing sensing, the common electrode driving circuit CD selectively writes a write signal Vw to one of the first electrode Tx1 and the second electrode Tx2 of the sensor driving electrode Tx, and the driver IC chip IC2 reads, from the detection electrode Rx, a read signal Vr indicative of a variation of a sensor signal occurring between the one of the first electrode Tx1 and second electrode Tx2, on one hand, and the detection electrode Rx, on the other hand.

As described above, at the sensing driving time, either the first electrode Tx1 or second electrode Tx2 of the sensor driving electrode Tx is always selectively used. In the present embodiment, at the sensing driving time, only the first electrode Tx1 is used.

In this embodiment, the write signal Vw is not written to a single sensor driving electrode Tx. As described above, the sensor driving electrode Tx is composed of an aggregate of the first electrode Tx1 and second electrode Tx2, which are spaced apart from each other. The write signal Vw is written to only the first electrode Tx1 of the sensor driving electrode Tx. The area of the first electrode Tx1 (the electrode in which the write signal Vw is written) is about half the area of the sensor driving electrode Tx, and is small. Since the parasitic capacitance of the first electrode Tx1 can be reduced, it is possible to reduce the load of the first electrode Tx1 and to decrease the time constant of the first electrode Tx1. Thereby, since the first electrode Tx1 with a small time constant can be used, the time that is needed for sensing can be shortened by that much.

From the above, a sensor-equipped liquid crystal display device DSP, which can reduce the time constant of an electrode that is used for sensing, can be obtained.

Modification 1 of the First Embodiment

Figure 7:
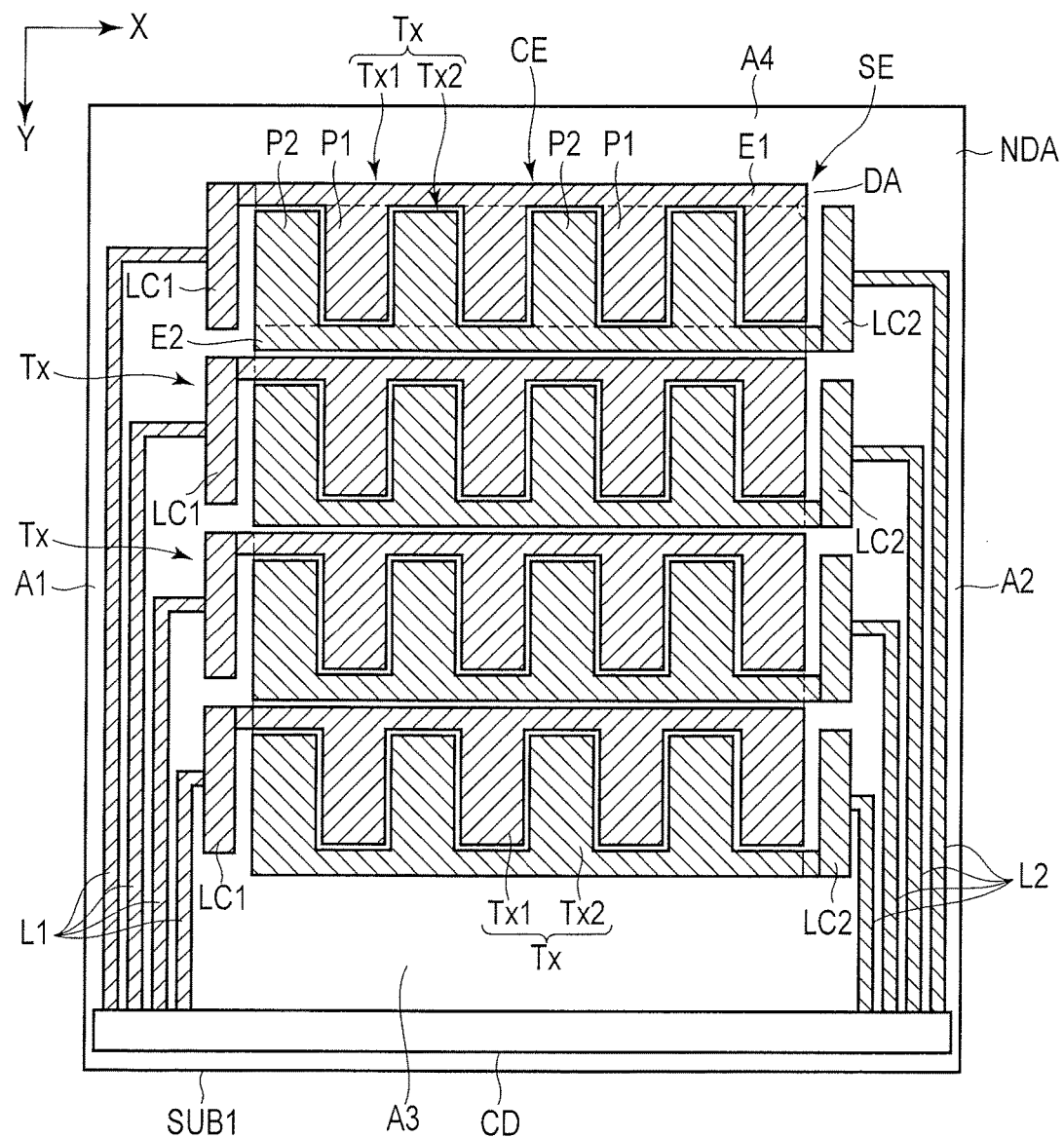
FIG. 7 is a plan view which schematically illustrates, in enlarged scale, a part of a first substrate of a sensor-equipped liquid crystal display device according to Modification 1 of the first embodiment.

Next, a sensor-equipped liquid crystal display device DSP according to Modification 1 of the above-described first embodiment is described. FIG. 7 is a plan view which schematically illustrates, in enlarged scale, a part of a first substrate SUB1 of the sensor-equipped liquid crystal display device DSP according to Modification 1 of the first embodiment.

As illustrated in FIG. 7, a first electrode Tx1 and a second electrode Tx2 of the sensor driving electrode Tx are spaced apart from each other and extend in parallel to each other. In the display area DA, an area of the first electrode Tx1 and an area of the second electrode Tx2 of the sensor driving electrode Tx are substantially equal. In addition, the first electrode Tx1 and second electrode Tx2 are formed not in band shapes but in comb shapes.

The first electrode Tx1 is formed such that a first extension portion E1 and a plurality of first projection portions P1 are formed integral. The first extension portion E1 extends in the row direction X and is formed in a band shape. The first projection portions P1 extend in the column direction Y, are formed in band shapes, and are spaced apart and arranged in the row direction X.

The second electrode Tx2 is formed such that a second extension portion E2 and a plurality of second projection portions P2 are formed integral. The second extension portion E2 extends in the row direction X and is formed in a band shape. The second projection portions P2 extend in the column direction Y, are formed in band shapes, and are spaced apart and arranged in the row direction X. Each second projection portion P2 is formed to project from one side edge of the second extension portion E2 in a direction opposite to the column direction Y indicated in FIG. 7.

Each first projection portion P1 is formed to project toward the second extension portion E2 from one side edge on that side of the first extension portion E1, which is opposed to the second extension portion E2. Each second projection portion P2 is formed to project toward the first extension portion E1 from one side edge on that side of the second extension portion E2, which is opposed to the first extension portion E1. The second projection, portions P2 and first projection portions P1 of the sensor driving electrodes Tx are alternately arranged in the row direction X.

In addition, the sensor SE of Modification 1 further includes first connection electrodes LC1 and second connection electrodes LC2. The first connection electrode LC1 is provided in the first non-display area A1 of the first substrate SUB1, and connects the first electrode Tx1 with first lead line L1. The second connection electrode LC2 is provided in the second non-display area A2 of the first substrate SUB1, and connects the second electrode Tx2 with second lead line L2. The first connection electrode LC1 and second connection electrode LC2 can be formed of a transparent, electrically conductive material, or a metallic material.

However, the sensor SE of Modification 1 may be formed without the first connection electrode LC1 and second connection electrode LC2. In this case, the first electrode Tx1 may be connected to the first lead line L1, and the second electrode Tx2 may be connected to the second lead line L2.

Also in the sensor-equipped liquid crystal display device DSP according to Modification 1 of the first embodiment with the above-described structure, the same advantageous effects as in the first embodiment can be obtained.

Modification 2 of the First Embodiment

Figure 8:
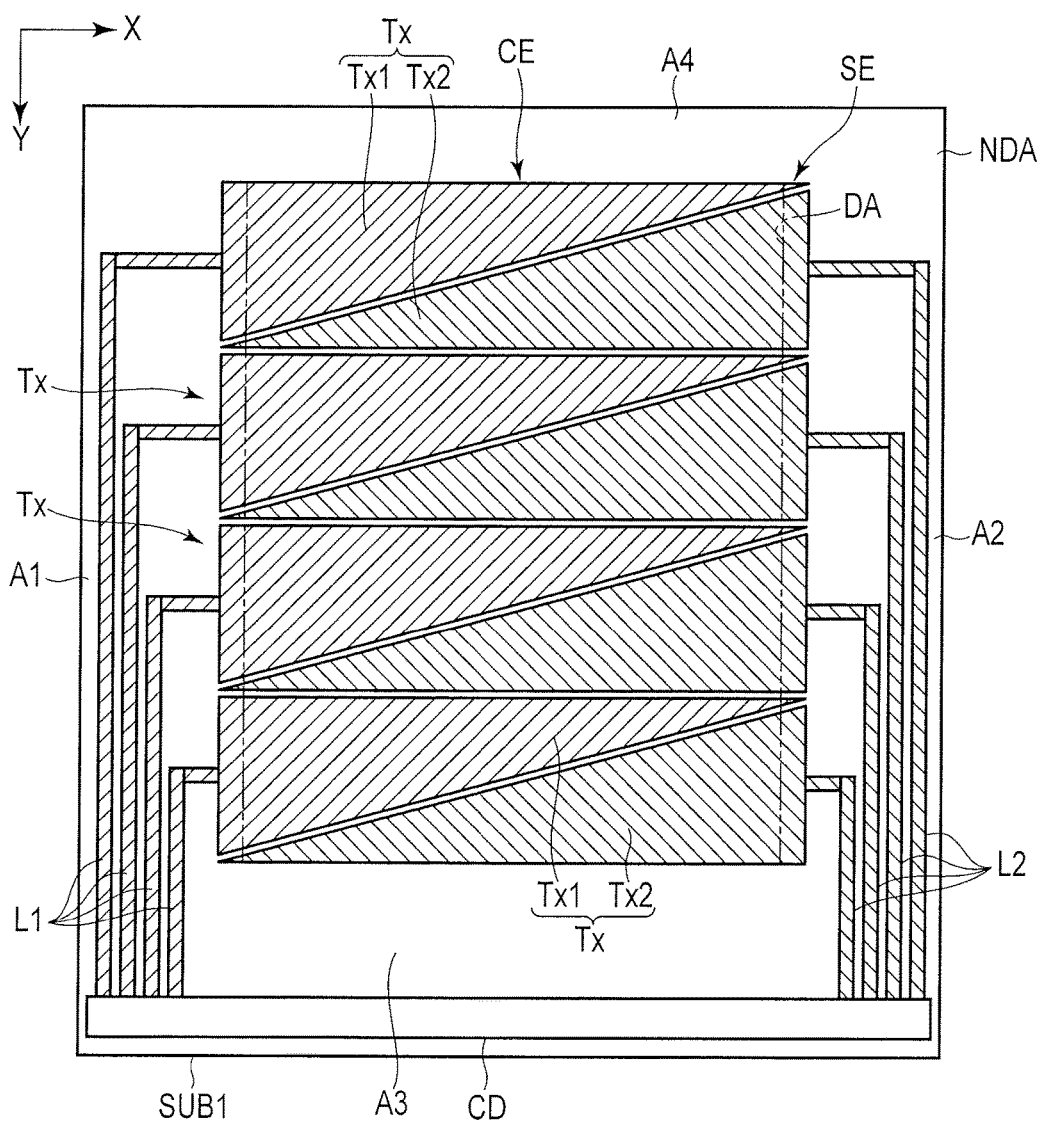
FIG. 8 is a plan view which schematically illustrates, in enlarged scale, a part of a first substrate of a sensor-equipped liquid crystal display device according to Modification 2 of the first embodiment.

Next, a sensor-equipped liquid crystal display device DSP according to Modification 2 of the first embodiment is described. FIG. 8 is a plan view which schematically illustrates, in enlarged scale, a part of a first substrate SUB1 of the sensor-equipped liquid crystal display device DSP according to Modification 2 of the first embodiment.

As illustrated in FIG. 8, a first electrode Tx1 and a second electrode Tx2 of the sensor driving electrode Tx are spaced apart from each other and extend in parallel to each other. In the display area DA, an area of the first electrode Tx1 and an area of the second electrode Tx2 of the sensor driving electrode Tx are substantially equal. In addition, the first electrode Tx1 and second electrode Tx2 are formed not in band shapes but in triangular shapes. The first electrode Tx1 includes a tip portion (corner portion) projecting from the first non-display area A1 toward the second non-display area A2. The second electrode Tx2 includes a tip portion (corner portion) projecting from the second non-display area A2 toward the first non-display area A1.

Also in the sensor-equipped liquid crystal display device DSP according to Modification 2 of the first embodiment with the above-described structure, the same advantageous effects as in the first embodiment can be obtained.

Modification 3 of the First Embodiment

Next, a sensor-equipped liquid crystal display device DSP according to Modification 3 of the first embodiment is described. FIG. 9 is a plan view which schematically illustrates, in enlarged scale, a part of a first substrate SUB1 of the sensor-equipped liquid crystal display device DSP according to Modification 3 of the first embodiment.

As illustrated in FIG. 9, the sensor SE of Modification 3 includes a plurality of first electrode groups TG1 and a plurality of second electrode groups TG2.

The first electrode group TG1 includes a plurality of first electrodes Tx1 and a first connection electrode LC1, and is formed in a comb shape. The first connection electrode LC1 is provided in the first non-display area A1 of the first substrate SUB1, and connects the first electrodes Tx1 with first lead line L1.

The second electrode group TG2 includes a plurality of second electrodes Tx2 and a second connection electrode LC2, and is formed in a comb shape. The second connection electrode LC2 is provided in the second non-display area A2 of the first substrate SUB1, and connects the second electrodes Tx2 with second lead line L2.

The first electrodes Tx1 and second electrodes Tx2 of the sensor driving electrode Tx are alternately arranged in the column direction Y. In Modification 3, the sensor driving electrode Tx includes three first electrodes Tx1 and three second electrodes Tx2. The three first electrodes Tx1 and three second electrodes Tx2 are formed such that sensor driving electrode Tx is equally divided by six in the column direction Y.

In this case, each of the number of first electrodes Tx1 and the number of second electrodes Tx2, which constitute each sensor driving electrode Tx, is not limited to three, but is variously modifiable and may be two, or four or more. In addition, the width in the column direction Y of the first electrode Tx1 and second electrode Tx2 is not specifically limited, and is variously modifiable. For example, the first electrode Tx1 and second electrode Tx2 may be shared by pixels PX of three to five rows.

Also in the sensor-equipped liquid crystal display device DSP according to Modification 3 of the first embodiment with the above-described structure, the same advantageous effects as in the first embodiment can be obtained.

Modification 4 of the First Embodiment

Next, a sensor-equipped liquid crystal display device DSP according to Modification 4 of the first embodiment is described. FIG. 10 is a plan view which schematically illustrates, in enlarged scale, a part of a first substrate SUB1 of the sensor-equipped liquid crystal display device DSP according to Modification 4 of the first embodiment.

As illustrated in FIG. 10, the sensor SE of Modification 4 further includes a plurality of first switching elements SW1, a plurality of second switching elements SW2, a plurality of third switching elements SW3, a plurality of fourth switching elements SW4, a first control line W1, and a second control line W2. The first switching elements SW1 constitute a first switching element group SG1, the second switching elements SW2 constitute a second switching element group SG2, the third switching elements SW3 constitute a third switching element group SG3, and the fourth switching elements SW4 constitute a fourth switching element group SG4.

Each first switching element SW1 is provided in the first non-display area A1 of the first substrate SUB1, and is connected the first lead line L1 with first electrode Tx1. Each second switching element SW2 is provided in the first non-display area A1 of the first substrate SUB1, and is connected the first lead line L1 with second electrode Tx2. Each third switching element SW3 is provided in the second non-display area A2 of the first substrate SUB1, and is connected the second lead line L2 with first electrode Tx1. Each fourth switching element SW4 is provided in the second non-display area A2 of the first substrate SUB1, and is connected the second lead line L2 with second electrode Tx2.

The first control line W1 is provided over the first non-display area A1, third non-display area A3 and second non-display area A2 of the first substrate SUB1, and is connected to the common electrode driving circuit CD, first switching element group SG1 and third switching element group SG3. The first control line W1 is connected to a control terminal of each first switching element SW1, and to a control terminal of each third switching element SW3.

The second control line W2 is provided over the first non-display area A1, third non-display area A3 and second non-display area A2 of the first substrate SUB1, and is connected to the common electrode driving circuit CD, second switching element group SG2 and fourth switching element group SG4. The second control line W2 is connected to a control terminal of each second switching element SW2, and to a control terminal of each fourth switching element SW4.

In this Modification, the first to fourth switching elements SW1 to SW4 are formed of, for instance, thin-film transistors. In this case, the control terminals of the first to fourth switching elements SW1 to SW4 are gate electrodes. When the pixel switching elements PSW are formed, the first to fourth switching elements SW1 to SW4 can be formed at the same time by using the same material as the pixel switching elements PSW.

In Modification 4, the common electrode driving circuit CD (driver IC chip IC1) functions not only as the first driver but also as a third driver. The common electrode driving circuit CD delivers a first control signal V1 to the first switching element group SG1 and third switching element group SG3 via the first control line W1, thereby changing over the first switching elements SW1 and third switching elements SW3 to a conductive state or a non-conductive state. In addition, the common electrode driving circuit CD delivers a second control signal V2 to the second switching element group SG2 and fourth switching element group SG4 via the second control line W2, thereby changing over the second switching elements SW2 and fourth switching elements SW4 to a conductive state or a non-conductive state.

In Modification 4, at the display driving time, the common electrode driving circuit CD outputs the first control signal V1 and second control signal V2 which change over the switching elements to the conductive state, and changes over the first switching elements SW1, second switching elements SW2, third switching elements SW3 and fourth switching elements SW4 to the conductive state. Furthermore, the common electrode driving circuit CD delivers common driving signals to the first electrodes Tx1 of the respective sensor driving electrodes Tx, on the one hand, via the first lead lines L1 and first switching elements SW1, and, on the other hand, via the second lead lines L2 and third switching elements SW3. Besides, the common electrode driving circuit CD delivers common driving signals to the second electrodes Tx2 of the respective sensor driving electrodes Tx, on the one hand, via the first lead lines L1 and second switching elements SW2, and, on the other hand, via the second lead lines L2 and fourth switching elements SW4. As described above, at the display driving time, the common driving signals are input to the first electrodes Tx1 and second electrodes Tx2 from both sides.

At the sensing driving time, the common electrode driving circuit CD selectively changes over the switching elements of one group, which is either a first group composed of the first switching elements SW1 and third switching elements SW3 or a second group composed of the second switching elements SW2 and fourth switching elements SW4, to the conductive state, and selectively changes over the switching elements of another group to the non-conductive state.

The common electrode driving circuit CD selectively writes a write signal to either the first electrode Tx1 or second electrode Tx2 of each sensor driving electrode Tx, via the first lead line L1, second lead line L2 and the switching element of the above-described one group.

For example, at the sensing driving time, the common electrode driving circuit CD changes over the first switching elements SW1 and third switching elements SW3 to the conductive state, and changes over the second switching elements SW2 and fourth switching elements SW4 to the non-conductive state.

The common electrode driving circuit CD writes write signals to the first electrodes Tx1 of the respective sensor driving electrodes Tx, on the one hand, via the first lead lines L1 and first switching elements SW1, and, on the other hand, via the second lead lines L2 and third switching elements SW3. As described above, at the sensing driving time, the write signals are written to the first electrodes Tx1 from both sides. Incidentally, at the sensing driving time, the second electrodes Tx2 are set in an electrically floating state.

Also in the sensor-equipped liquid crystal display device DSP according to Modification 4 of the first embodiment with the above-described structure, the same advantageous effects as in the first embodiment can be obtained. Furthermore, in Modification 4, the common driving signals and write signals can be delivered to the electrodes (first electrodes Tx1, second electrodes Tx2) from both sides of these electrodes. Therefore, the time that is needed for sensing can be shortened.

Modification 5 of the First Embodiment

Next, a sensor-equipped liquid crystal display device DSP according to Modification 5 of the first embodiment is described. The sensor-equipped liquid crystal display device DSP of Modification 5 is configured by excluding the second lead lines L2, third switching element group SG3 and fourth switching element group SG4 from the sensor-equipped liquid crystal display device DSP of Modification 4.

Alternatively, the sensor-equipped liquid crystal display device DSP of Modification 5 is configured by excluding the first lead lines L1, first switching element group SG1 and second switching element group SG2 from the sensor-equipped liquid crystal display device DSP of Modification 4.

Also in the sensor-equipped liquid crystal display device DSP according to Modification 5, the same advantageous effects as in the first embodiment can be obtained.

Modification 6 of the First Embodiment

Figure 11:
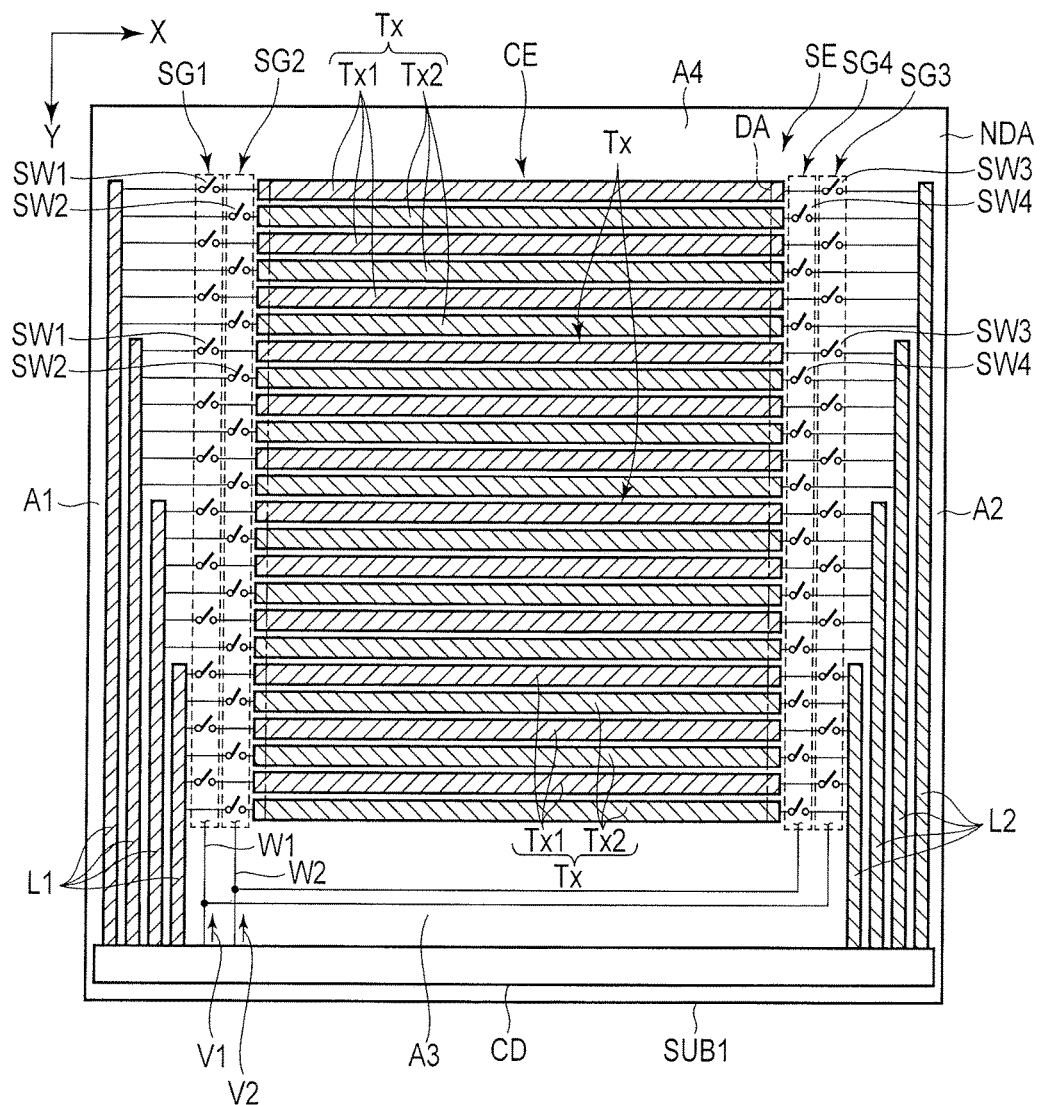
FIG. 11 is a plan view which schematically illustrates, in enlarged scale, a part of a first substrate of a sensor-equipped liquid crystal display device according to Modification 6 of the first embodiment.

Next, a sensor-equipped liquid crystal display device DSP according to Modification 6 of the first embodiment is described. FIG. 11 is a plan view which schematically illustrates, in enlarged scale, a part of a first substrate SUB1 of the sensor-equipped liquid crystal display device DSP according to Modification 6 of the first embodiment.

As illustrated in FIG. 11, the sensor-equipped liquid crystal display device DSP of Modification 6 is configured like the sensor-equipped liquid crystal display device DSP of Modification 4, except that each sensor driving electrode Tx is composed of a plurality of first electrodes Tx1 and a plurality of second electrodes Tx2. In the meantime, the first switching elements SW1 are electrically connected to the first electrodes Tx1 in a one-to-one correspondence. The second switching elements SW2 are electrically connected to the second electrodes Tx2 in a one-to-one correspondence. The third switching elements SW3 are electrically connected to the first electrodes Tx1 in a one-to-one correspondence. The fourth switching elements SW4 are electrically connected to the second electrodes Tx2 in a one-to-one correspondence.

Also in the sensor-equipped liquid crystal display device DSP according to Modification 6 of the first embodiment with the above-described structure, the same advantageous effects as in the first embodiment can be obtained. Furthermore, in Modification 6, like the above-described Modification 4, the common driving signals and write signals can be delivered to the electrodes (first electrodes Tx1, second electrodes Tx2) from both sides of these electrodes. Therefore, the time that is needed for sensing can be shortened.

Modification 7 of the First Embodiment

Next, a sensor-equipped liquid crystal display device DSP according to Modification 7 of the first embodiment is described. The sensor-equipped liquid crystal display device DSP of Modification 7 is configured by excluding the second lead lines L2, third switching element group SG3 and fourth switching element group SG4 from the sensor-equipped liquid crystal display device DSP of Modification 6.

Alternatively, the sensor-equipped liquid crystal display device DSP of Modification 7 is configured by excluding the first lead lines L1, first switching element group SG1 and second switching element group SG2 from the sensor-equipped liquid crystal display device DSP of Modification 6.

Also in the sensor-equipped liquid crystal display device DSP according to Modification 7, the same advantageous effects as in the first embodiment can be obtained.

Modification 8 of the First Embodiment

Figure 12:
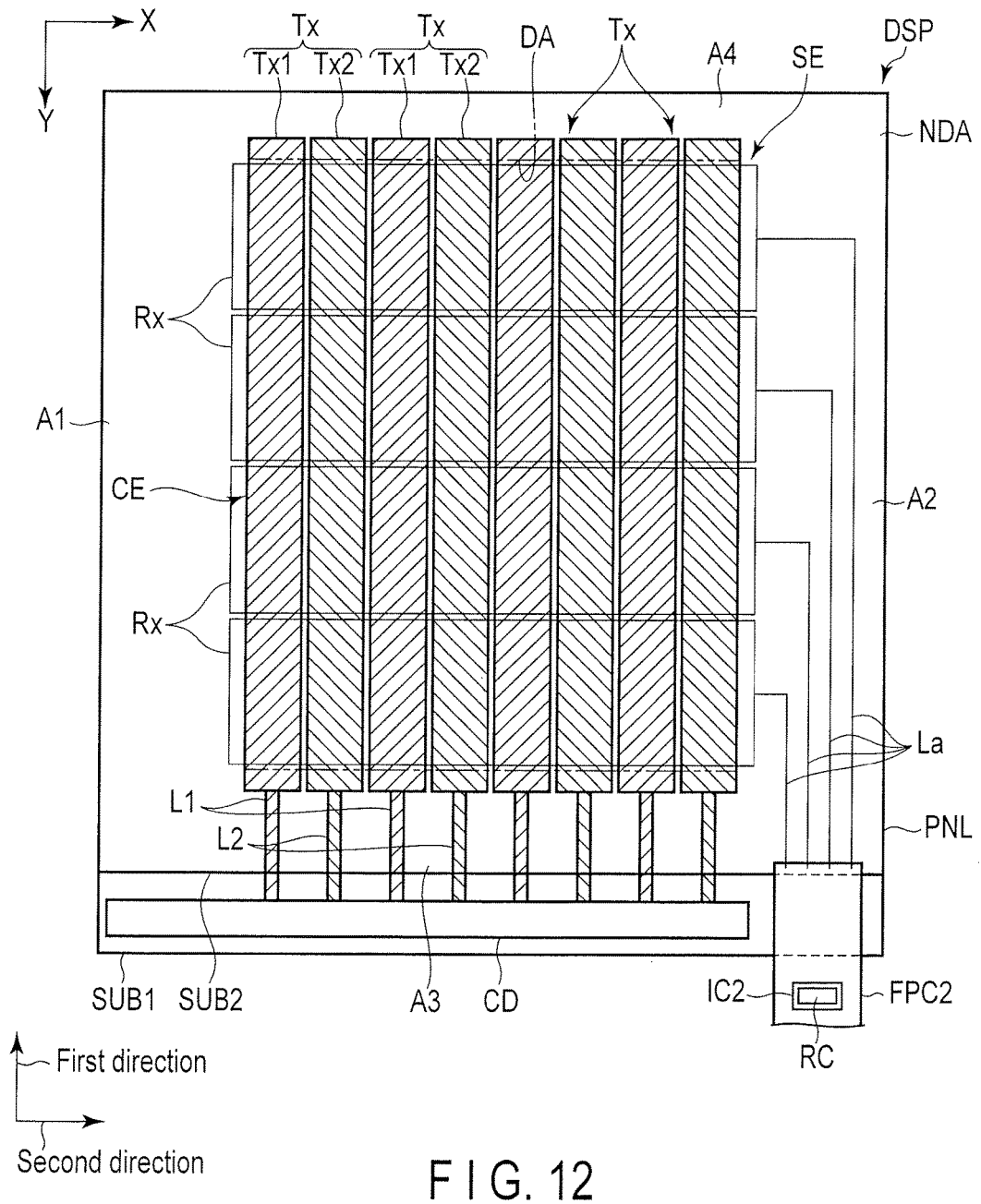
FIG. 12 is a plan view which schematically illustrates, in enlarged scale, a part of a liquid crystal display panel of a sensor-equipped liquid crystal display device according to Modification 8 of the first embodiment.

Next, a sensor-equipped liquid crystal display device DSP according to Modification 8 of the first embodiment is described. FIG. 12 is a plan view which schematically illustrates, in enlarged scale, a part of a liquid crystal display panel PNL of the sensor-equipped liquid crystal display device DSP according to Modification 8 of the first embodiment.

As illustrated in FIG. 12, the sensor-equipped liquid crystal display device DSP of Modification 8 differs from the sensor-equipped liquid crystal display device DSP according to the first embodiment in that the first electrodes Tx1 and second electrodes Tx2 of the common electrode CE extend in the column direction Y, and the detection electrodes Rx extend in the row direction X. In Modification 8, a direction opposite to the column direction Y is the first direction, and the row direction X is the second direction.

The first electrodes Tx1 and second electrodes Tx2 are spaced apart and arranged in the row direction X, and extend substantially linearly in the column direction Y. The detection electrodes Rx are spaced apart and arranged in the column direction Y and extend substantially linearly in the row direction X. Each of the first electrodes Tx1 and second electrodes Tx2 is shared by a plurality of columns of pixels PX.

First lead lines L1 are provided in the third non-display area A3 of the first substrate SUB1, and connect the first electrodes Tx1 with the common electrode driving circuit CD. Second lead lines L2 are provided in the third non-display area A3 of the first substrate SUB1, and connect the second electrodes Tx2 with the common electrode driving circuit CD.

Also in the sensor-equipped liquid crystal display device DSP according to Modification 8, the same advantageous effects as in the first embodiment can be obtained.

In association with the above-described Modification 8, also in the above-described Modifications 1 to 7, the first electrodes Tx1 and second electrodes Tx2 of the common electrode CE may extend in the column direction Y, and the detection electrodes Rx may extend in the row direction X.

Second Embodiment

Figure 13:
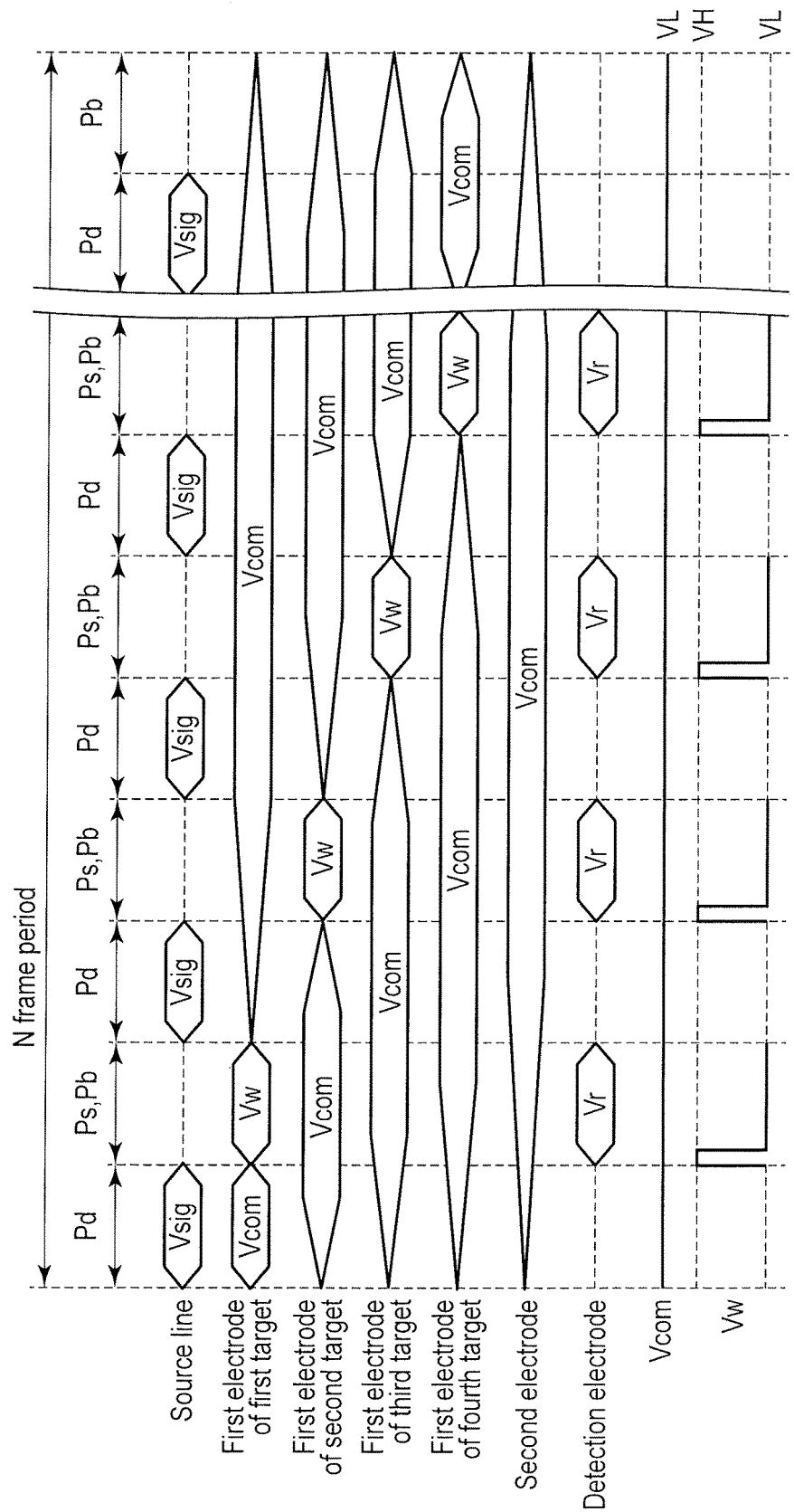
FIG. 13 is a timing chart for explaining a method of driving a liquid crystal display device according to a second embodiment, FIG. 13 being a view illustrating a video signal, a common driving signal, a write signal and a read signal in an N frame period.
Figure 14:
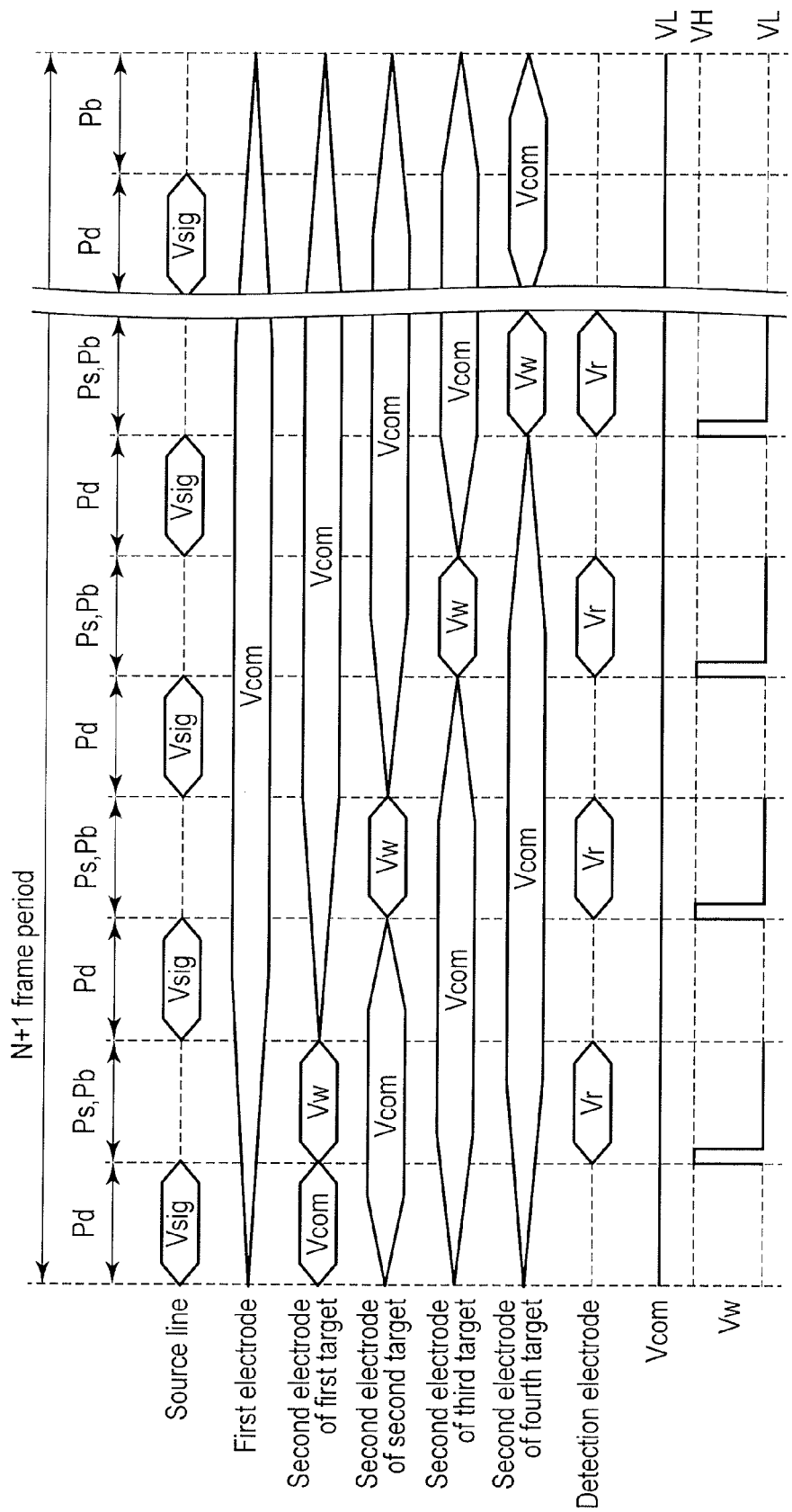
FIG. 14 is a timing chart, subsequent to FIG. 13, for explaining the method of driving the liquid crystal display device according to the second embodiment, FIG. 14 being a view illustrating a video signal, a common driving signal, a write signal and a read signal in an N+1 frame period.

Next, a detailed description is given of a sensor-equipped liquid crystal display device DSP and a method of driving the sensor-equipped liquid crystal display device DSP according to a second embodiment. FIG. 13 is a timing chart for explaining a method of driving the liquid crystal display device DSP according to the present embodiment, FIG. 13 being a view illustrating a video signal Vsig, a common driving signal Vcom, a write signal Vw and a read signal Vr in an N frame period. FIG. 14 is a timing chart, subsequent to FIG. 13, for explaining the method of driving the liquid crystal display device DSP according to this embodiment, FIG. 14 being a view illustrating a video signal Vsig, a common driving signal Vcom, a write signal Vw and a read signal Vr in an N+1 frame period. The liquid crystal display device DSP according to this embodiment is formed like the liquid crystal display device of the above-described first embodiment.

In the present embodiment, in general terms, the common electrode driving circuit CD selectively writes a write signal Vw to the first electrode Tx1 in an arbitrary first frame period, and selectively writes a write signal Vw to the second electrode Tx2 in a second frame period which follows the first frame period. Specifically, the common electrode driving circuit CD changes a target of write of the write signal Vw between an odd-numbered frame period and an even-numbered frame period.

To begin with, a description is given of a method of driving the liquid crystal display device DSP in an N frame period, which is an arbitrary N-th 1-frame (1F) period.

As illustrated in FIG. 13, in this embodiment, the driver IC chip IC1, driver IC chip IC2, gate line driving circuit GD and control module CM repeatedly execute, in the N frame period, display driving which is executed in a display driving period Pd, and sensing driving which is executed in a sensing period (input position information detection period) Ps that does not overlap the display driving period Pd. The sensing period Ps is, for example, a blanking period. Examples of the blanking period include a horizontal blanking period and a vertical blanking period. In this embodiment, the blanking period is a horizontal blanking period Pb. In addition, in each sensing period, one or plural sensor driving electrodes Tx can be set as targets of sensing driving.

In the display driving period Pd, a control signal is delivered to the gate line G from the gate line driving circuit GD, a video signal Vsig is delivered to the source line S from the source line driving circuit SD, and a common driving signal Vcom is delivered to the common electrode CE (first electrode Tx1 and second electrode Tx2) from the common electrode driving circuit CD, thereby driving the liquid crystal display panel PNL.

In the present embodiment, in a first (initial) display driving period Pd of an N frame period, a control signal is delivered to the gate line G1, a video signal Vsig is delivered to the source lines S1 to Sm, and a common driving signal Vcom is delivered to the common electrode CE, thereby driving the pixels PX of the first row. Subsequently, in a second display driving period Pd of the N frame period, a control signal is delivered to the gate line G2, a video signal Vsig is delivered to the source lines S1 to Sm, and a common driving signal Vcom is delivered to the common electrode CE, thereby driving the pixels PX of the second row. Similarly, in third to (n−1)-th display driving periods Pd of the N frame period, the pixels PX of the third to (n−1)-th rows are driven on a row-by-row basis. Then, in an n-th (last) display driving period Pd of the N frame period, a control signal is delivered to the gate line Gn, a video signal Vsig is delivered to the source lines S1 to Sm, and a common driving signal Vcom is delivered to the common electrode CE, thereby driving the pixels PX of the n-th row.

In the sensing period Ps, the input of the control signal and video signal Vsig to the liquid crystal display panel PNL is stopped, and the sensor SE is driven. When the sensor SE is driven, the common electrode driving circuit CD writes a write signal Vw to the first electrode Tx1, and keeps the second electrode Tx2 supplied with the common driving signal Vcom. The potential of the second electrode Tx2 is fixed. The driver IC chip IC2 reads a read signal Vr from the detection electrode Rx. Thereby, input position information is determined based on the read signal Vr that was read.

Incidentally, the write signal Vw is a pulse signal, and a high-level potential of the write signal Vw is a high potential VH. A low-level potential of the write signal Vw is equal to the potential of the common driving signal Vcom, and is a low potential VL.

As described above, the structure of the liquid crystal display device DSP according to this embodiment is the same as the structure in the above-described first embodiment. The number of sensor driving electrodes Tx, which are targets of write of the write signal Vw, is four. In the description below, the four sensor driving electrodes Tx are also referred to as first to fourth targets. As illustrated in FIG. 5, in the present embodiment, the first target is the uppermost sensor driving electrode Tx, the fourth target is the lowermost sensor driving electrode Tx, the second target is a sensor driving electrode Tx between the first target and the fourth target, and the third target is the sensor driving electrode Tx between the second target and the fourth target.

Incidentally, the relationship between the four sensor driving electrodes Tx and the first to fourth targets is similarly applicable to Modification 1 illustrated in FIG. 7, Modification 2 illustrated in FIG. 8 and Modification 3 illustrated in FIG. 9, as well as the present embodiment illustrated in FIG. 5.

Additionally, the relationship between the four sensor driving electrodes Tx and the first to fourth targets is also applicable to Modification 8 illustrated in FIG. 12. However, as illustrated in FIG. 12, in the case of Modification 8, the first target is the leftmost sensor driving electrode Tx, the fourth target is the rightmost sensor driving electrode Tx, the second target is a sensor driving electrode Tx between the first target and the fourth target, and the third target is the sensor driving electrode Tx between the second target and the fourth target.

In the present embodiment, in a first (initial) sensing period Ps of the N frame period, a write signal Vw is written to only the first electrode Tx1 of the first target, a common driving signal Vcom is delivered to the first electrodes Tx1 of the second to fourth targets and all the second electrodes Tx2, and a read signal Vr is read from each detection electrode Rx. Thereafter, in a second sensing period Ps of the N frame period, a write signal Vw is written to only the first electrode Tx1 of the second target, a common driving signal Vcom is delivered to the first electrodes Tx1 of the first, third and fourth targets and all the second electrodes Tx2, and a read signal Vr is read from each detection electrode Rx.

Next, in a third sensing period Ps of the N frame period, a write signal Vw is written to only the first electrode Tx1 of the third target, a common driving signal Vcom is delivered to the first electrodes Tx1 of the first, second and fourth targets and all the second electrodes Tx2, and a read signal Vr is read from each detection electrode Rx. Then, in a fourth sensing period Ps of the N frame period, a write signal Vw is written to only the first electrode Tx1 of the fourth target, a common driving signal Vcom is delivered to the first electrodes Tx1 of the first to third targets and all the second electrodes Tx2, and a read signal Vr is read from each detection electrode Rx.

As described above, the number of sensor driving electrodes Tx is four, and, in this embodiment, the sensing period Ps in the N frame period occurs four times. Thereby, input position information can be detected in the vicinities of areas opposed to all intersections between the first electrodes Tx1 and the detection electrodes Rx. In the N frame period, in a fifth display driving period Pd onwards, the display driving period Pd and horizontal blanking period Pb are alternately provided.

Incidentally, the number of times of the sensing period Ps in the N frame period is not limited to four, and is variously modifiable, and the sensing period Ps may occur five times or more. For example, the number of times of the sensing period Ps in the N frame period may be a multiple of 4, excluding 4. In this case, the input position information can repeatedly be detected by repeatedly writing the write signal Vw to the first electrodes Tx1 of the first to fourth targets.

In addition, some sensor driving electrodes may be combined and set to be the above-described target. Specifically, the first electrode, which is the first target in the above description, and the first electrode, which is the second target, may be combined and set to be the first target, and the first electrode, which is the third target in the above description, and the first electrode, which is the fourth target, may be combined and set to be the second target. In this manner, it is possible to adopt such a configuration that some electrodes are combined and set to the electrodes to which the write signal Vw is supplied at the same time.

Next, a description is given of a method of driving the liquid crystal display device DSP in an N+1 frame period, which is an arbitrary (N+1)-th 1-frame (1F) period As illustrated in FIG. 14, in this embodiment, the driver IC chip IC1, driver IC chip IC2, gate line driving circuit GD and control module CM repeatedly execute, in the N+1 frame period, display driving which is executed in a display driving period Pd, and sensing driving which is executed in a sensing period (input position information detection period) Ps that does not overlap the display driving period Pd.

In the display driving period Pd, a control signal is delivered to the gate line G from the gate line driving circuit GD, a video signal Vsig is delivered to the source line S from the source line driving circuit SD, and a common driving signal Vcom is delivered to the common electrode CE (first electrode Tx1 and second electrode Tx2) from the common electrode driving circuit CD, thereby driving the liquid crystal display panel PNL. Incidentally, the display driving in the N+1 frame period is the same as the above-described display driving in the N frame period, and the pixels PX of the first row through the pixels PX of the n-th row are sequentially driven.

In the sensing period Ps, the input of the control signal and video signal Vsig to the liquid crystal display panel PNL is stopped, and the sensor SE is driven. When the sensor SE is driven, the common electrode driving circuit CD keeps the first electrode Tx1 supplied with the common driving signal Vcom, and writes a write signal Vw to the second electrode Tx2. The potential of the first electrode Tx1 is fixed. The driver IC chip IC2 reads a read signal Vr from the detection electrode Rx. Thereby, input position information is determined based on the read signal Vr that was read.

In the present embodiment, in a first (initial) sensing period Ps of the N+1 frame period, a write signal Vw is written to only the second electrode Tx2 of the first target, a common driving signal Vcom is delivered to the second electrodes Tx2 of the second to fourth targets and all the first electrodes Tx1, and a read signal Vr is read from each detection electrode Rx. Thereafter, in a second sensing period Ps of the N+1 frame period, a write signal Vw is written to only the second electrode Tx2 of the second target, a common driving signal Vcom is delivered to the second electrodes Tx2 of the first, third and fourth targets and all the first electrodes Tx1, and a read signal Vr is read from each detection electrode Rx.

Next, in a third sensing period Ps of the N+1 frame period, a write signal Vw is written to only the second electrode Tx2 of the third target, a common driving signal Vcom is delivered to the second electrodes Tx2 of the first, second and fourth targets and all the first electrodes Tx1, and a read signal Vr is read from each detection electrode Rx. Then, in a fourth sensing period Ps of the N+1 frame period, a write signal Vw is written to only the second electrode Tx2 of the fourth target, a common driving signal Vcom is delivered to the second electrodes Tx2 of the first to third targets and all the first electrodes Tx1, and a read signal Vr is read from each detection electrode Rx.

In this embodiment, the sensing period Ps of the N+1 frame period occurs four times. Thereby, input position information can be detected in the vicinities of areas opposed to all intersections between the second electrodes Tx2 and the detection electrodes Rx. In the N+1 frame period, in a fifth display driving period Pd onwards, the display driving period Pd and horizontal blanking period Pb are alternately provided.

Incidentally, also in the N+1 frame period, the number of times of the sensing period Ps is not limited to four, and is variously modifiable, and the sensing period Ps may occur five times or more.

According to the sensor-equipped liquid crystal display device DSP and the method of driving the sensor-equipped liquid crystal display device DSP of the second embodiment with the above-described structure, the liquid crystal display device DSP is configured like the liquid crystal display device of the first embodiment. In the present embodiment, too, at the sensing driving time, either the first electrodes Tx1 or the second electrodes Tx2 of the sensor driving electrodes Tx are always selectively used. Therefore, also in the sensor-equipped liquid crystal display device DSP according to this embodiment, the same advantageous effects as in the first embodiment can be obtained.

Furthermore, in this embodiment, the target of write of the write signal Vw is switched on a frame-by-frame basis. In the unit of an even number of frames, the image display condition for the pixels PX, which use the first electrodes Tx1, becomes identical to the image display condition for the pixels PX, which use the second electrodes Tx2. Therefore, the liquid crystal display device DSP, which can reduce the occurrence of image burn-in or flicker, can be obtained.

From the above, the liquid crystal display device DSP, which can reduce the time constant of the electrodes for use in sensing, and the method of driving the liquid crystal display device DSP can be obtained.

Modification 1 of the Second Embodiment

Figure 15:
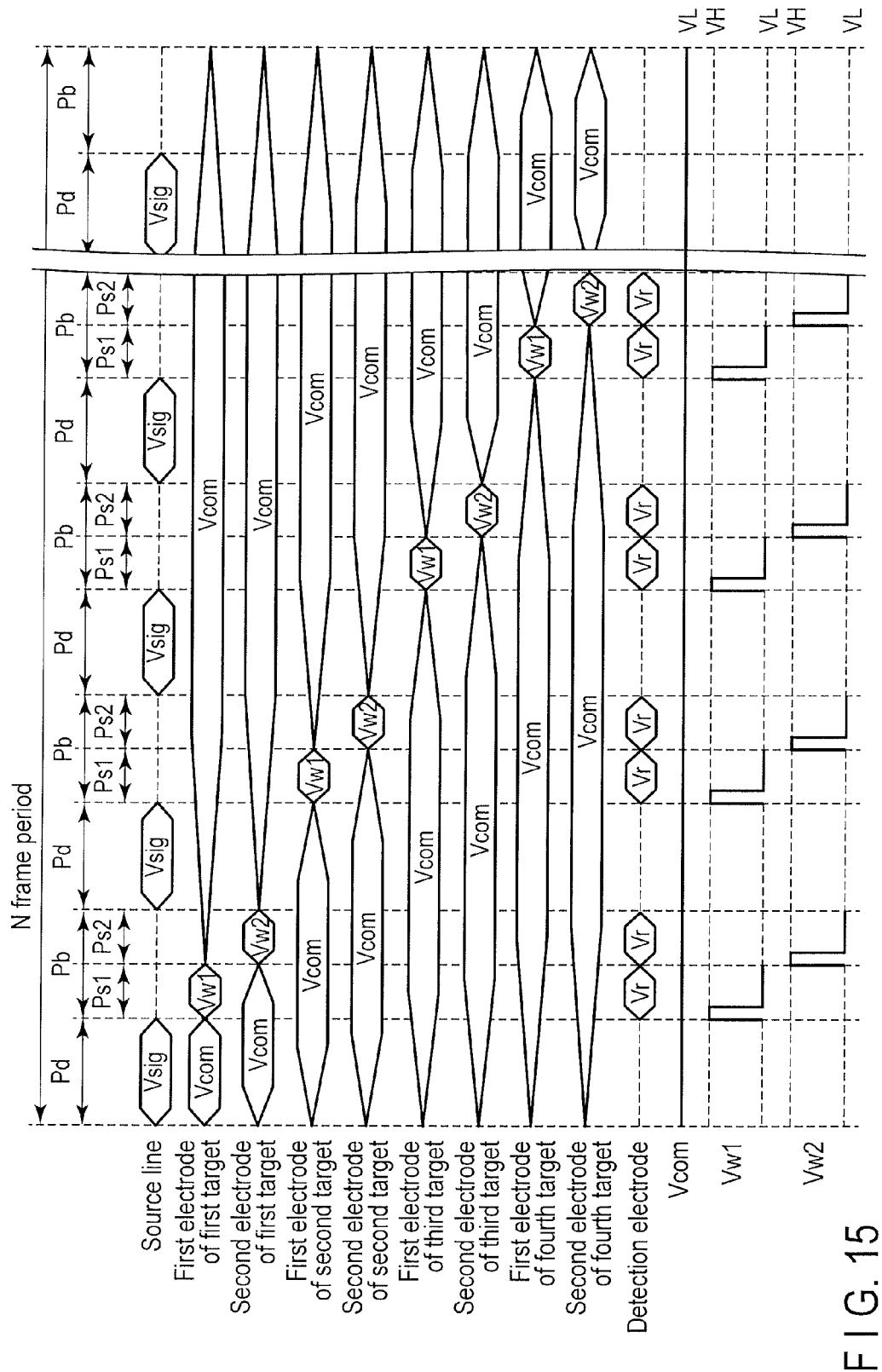
FIG. 15 is a timing chart for explaining a method of driving a liquid crystal display device according to Modification 1 of the second embodiment, FIG. 15 being a view illustrating a video signal, a common driving signal, a write signal and a read signal in an N frame period.

Next, a description is given of a sensor-equipped liquid crystal display device DSP and a method of driving the sensor-equipped liquid crystal display device DSP according to Modification 1 of the second embodiment. FIG. 15 is a timing chart for explaining the method of driving the liquid crystal display device DSP according to Modification 1 of the second embodiment, FIG. 15 being a view illustrating a video signal Vsig, a common driving signal Vcom, a write signal Vw1, Vw2, and a read signal Vr in an N frame period.

As illustrated in FIG. 15, each sensing period for executing sensing (a horizontal or vertical blanking period; hereinafter, simply referred to as "blanking period Pb") is halved into a first period Ps1 and a second period Ps2. The common electrode driving circuit CD selectively writes a write signal to the first electrode Tx1 and second electrode Tx2 in every frame.

In a first (initial) blanking period Pb of an N frame period, at first, in a first period Ps1, a write signal Vw1 is written to only the first electrode Tx1 of the first target, a common driving signal Vcom is delivered to the first electrodes Tx1 of the second to fourth targets and all the second electrodes Tx2, and a read signal Vr is read from each detection electrode Rx. In a subsequent second period Ps2, a write signal Vw2 is written to only the second electrode Tx2 of the first target, a common driving signal Vcom is delivered to the second electrodes Tx2 of the second to fourth targets and all the first electrodes Tx1, and a read signal Vr is read from each detection electrode Rx. In this case, the write signal Vw1 and write signal Vw2 are pulse signals with the same waveform, which are different with respect to only the timing, and are denoted by different reference signs for the purpose of convenience.

Thereafter, in a second blanking period Pb of the N frame period, at first, in a first period Ps1, a write signal Vw1 is written to only the first electrode Tx1 of the second target, a common driving signal Vcom is delivered to the first electrodes Tx1 of the first, third and fourth targets and all the second electrodes Tx2, and a read signal Vr is read from each detection electrode Rx. In a subsequent second period Ps2, a write signal Vw2 is written to only the second electrode Tx2 of the second target, a common driving signal Vcom is delivered to the second electrodes Tx2 of the first, third and fourth targets and all the first electrodes Tx1, and a read signal Vr is read from each detection electrode Rx.

Next, in a third blanking period Pb of the N frame period, at first, in a first period Ps1, a write signal Vw1 is written to only the first electrode Tx1 of the third target, a common driving signal Vcom is delivered to the first electrodes Tx1 of the first, second and fourth targets and all the second electrodes Tx2, and a read signal Vr is read from each detection electrode Rx. In a subsequent second period Ps2, a write signal Vw2 is written to only the second electrode Tx2 of the third target, a common driving signal Vcom is delivered to the second electrodes Tx2 of the first, second and fourth targets and all the first electrodes Tx1, and a read signal Vr is read from each detection electrode Rx.

Subsequently, in a fourth blanking period Pb of the N frame period, at first, in a first period Ps1, a write signal Vw1 is written to only the first electrode Tx1 of the fourth target, a common driving signal Vcom is delivered to the first electrodes Tx1 of the first to third targets and all the second electrodes Tx2, and a read signal Vr is read from each detection electrode Rx. In a subsequent second period Ps2, a write signal Vw2 is written to only the second electrode Tx2 of the fourth target, a common driving signal Vcom is delivered to the second electrodes Tx2 of the first to third targets and all the first electrodes Tx1, and a read signal Vr is read from each detection electrode Rx.

In this Modification 1, too, the number of sensor driving electrodes Tx is four, and, in this Modification 1, the sensing period Ps in the N frame period occurs four times. Thereby, in one frame period, input position information can be detected in the vicinities of areas opposed to all intersections between the first electrodes Tx1 and the detection electrodes Rx. Furthermore, input position information can be detected in the vicinities of areas opposed to all intersections between the second electrodes Tx2 and the detection electrodes Rx. In the N frame period, in a fifth display driving period Pd onwards, the display driving period Pd and blanking period Pb are alternately provided.

Incidentally, in the N frame period of this Modification 1, too, the number of times of the sensing period is not limited to four, and is variously modifiable, and the sensing period Ps may occur five times or more.

In this Modification 1, in the unit of one frame, the image display condition for the pixels PX, which use the first electrodes Tx1, becomes identical to the image display condition for the pixels PX, which use the second electrodes Tx2. Therefore, also in the sensor-equipped liquid crystal display device DSP and the method of driving the sensor-equipped liquid crystal display device DSP according to this Modification 1, the same advantageous effects as in the second embodiment can be obtained.

Modification 2 of the Second Embodiment

Next, a description is given of a sensor-equipped liquid crystal display device DSP and a method of driving the sensor-equipped liquid crystal display device DSP according to Modification 2 of the second embodiment.

In the above-described Modification 1 of the second embodiment, the case in which each sensing period is halved into the first period Ps1 and second period Ps2 has been described, but the sensing period is not limited to this case and is variously modifiable. For example, each sensing period may equally be divided into an even number of four or more. In this case, a write signal Vw1 may be written to the first electrode Tx1 in an odd-numbered period, and a write signal Vw2 may be written to the second electrode Tx2 in an even-numbered period. In this case, with respect to each sensor driving electrode Tx, the period in which the write signal is written to the first electrode Tx1 and the period in which the write signal is written to the second electrode Tx2 are halved in the sensing period.

For example, in the case of the sensor-equipped liquid crystal display device DSP according to the above-described Modification 6 of the first embodiment illustrated in FIG. 11, the sensing period may equally be divided into six, and write signals may be selectively be written to three first electrodes Tx1 and three second electrodes Tx2 of each sensor driving electrode Tx. However, in this case, it is necessary to configure the liquid crystal display device DSP so that control signals (V1, V2) can independently be delivered to the first to fourth switching elements SW1 to SW4.

Also in the sensor-equipped liquid crystal display device DSP and the method of driving the same according to this Modification 2, the same advantageous effects as in Modification 1 of the second embodiment can be obtained.

Modification 3 of the Second Embodiment

Next, a description is given of a sensor-equipped liquid crystal display device DSP and a method of driving the sensor-equipped liquid crystal display device DSP according to Modification 3 of the second embodiment.

In the above-described Modification 1 of the second embodiment, both the first period Ps1 and the second period Ps2 are provided in each sensing period, but the sensing period is not limited to this case and is variously modifiable. For example, only the first period Ps1 may be set in an odd-numbered sensing period (blanking period Pb) of the N frame period, and only the second period Ps2 may be set in an even-numbered sensing period (horizontal blanking period Pb) of the N frame period.

To be more specific, in the N frame period, a write signal Vw1 is written to only the first electrode Tx1 of the first target in a first blanking period Pb (first period Ps1), and a write signal Vw2 is written to only the second electrode Tx2 of the first target in a second blanking period Pb (second period Ps2). Subsequently, a write signal Vw1 is written to only the first electrode Tx1 of the second target in a third blanking period Pb (first period Ps1), and a write signal Vw2 is written to only the second electrode Tx2 of the second target in a fourth blanking period Pb (second period Ps2).

Thereafter, a write signal Vw1 is written to only the first electrode Tx1 of the third target in a fifth blanking period Pb (first period Ps1), and a write signal Vw2 is written to only the second electrode Tx2 of the third target in a sixth blanking period Pb (second period Ps2). Then, a write signal Vw1 is written to only the first electrode Tx1 of the fourth target in a seventh blanking period Pb (first period Ps1), and a write signal Vw2 is written to only the second electrode Tx2 of the fourth target in an eighth blanking period Pb (second period Ps2).

Also in the sensor-equipped liquid crystal display device DSP according to this Modification 3 and the method of driving the same, the same advantageous effects as in Modification 1 of the second embodiment can be obtained.

Modification 4 of the Second Embodiment

Next, a description is given of a sensor-equipped liquid crystal display device DSP and a method of driving the sensor-equipped liquid crystal display device DSP according to Modification 4 of the second embodiment.

The driving method of the sensor-equipped liquid crystal display device DSP according to this Modification 4 differs from that of the sensor-equipped liquid crystal display device DSP according to the above-described Modification 1 of the second embodiment in that, during the period in which the write signal is written to one of the first electrode Tx1 and second electrode Tx2, not the common driving signal Vcom, but a signal of 0 V (ground voltage) is delivered to another of the first electrode Tx1 and second electrode Tx2. In this case, too, the potential of the other of the first electrode Tx1 and second electrode Tx2 is fixed at each time of sensing driving.

Also in the sensor-equipped liquid crystal display device DSP and the method of driving the same according to this Modification 4, the same advantageous effects as in Modification 1 of the second embodiment can be obtained.

In association with the above-described Modification 4, also in the above-described Modifications 2 and 3 of the second embodiment, during the period in which the write signal is written to one of the first electrode Tx1 and second electrode Tx2, a signal of 0 V (ground voltage) may be delivered to the other of the first electrode Tx1 and second electrode Tx2.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the lead lines La and detection electrodes Rx may be provided above the inner surface of the second insulative substrate 20 (that surface of the second insulative substrate 20, which is opposed to the first substrate SUB1). Alternatively, the lead lines La and detection electrodes Rx may be provided above the inner surface of the first insulative substrate 10 (that surface of the first insulative substrate 10, which is opposed to the second substrate SUB2). Specifically, the lead lines La and detection electrodes Rx may be provided in any one of layers of the layer structure including the liquid crystal display panel PNL and a cover which covers this liquid crystal display panel PNL.

In the case where the lead lines La and detection electrodes Rx are positioned between the first insulative substrate 10 and the second insulative substrate 20, the driver IC chip IC1 and driver IC chip IC2 may be formed as one piece. Specifically, the driver IC chip IC1 and driver IC chip IC2 may be integrated into a single driver IC chip (driver). In this case, this single driver IC chip is connected to the liquid crystal display panel PNL and control module CM. Furthermore, the single driver IC chip is connected to the sensor SE (lead lines La) via wiring lines and electrodes formed on the liquid crystal display panel PNL.

Besides, the above-described first driver is not limited to the driver IC chip IC1, and is variously modifiable. It should suffice if the first driver can deliver the common driving signal Vcom and can write the write signal Vw to the first electrode Tx1 and second electrode Tx2.

The above-described second driver is not limited to the driver IC chip IC2, and is variously modifiable. It should suffice if the second driver is a driver which reads the read signal Vr from the detection electrode Rx.

The above-described third driver is not limited to the driver IC chip IC1 (common electrode driving circuit CD), and is variously modifiable. It should suffice if the third driver is a driver which changes over the switching elements (first to fourth switching elements SW1 to SW4), which are connected to the sensor driving electrodes Tx, to either the conductive state or non-conductive state.

In each sensor driving electrode Tx, the area of the first electrode Tx1 and the area of the second electrode Tx2 may not be substantially equal. However, in each sensor driving electrode Tx, it is desirable that the area of the first electrode Tx1 and the area of the second electrode Tx2 be substantially equal. Alternatively, in each sensor driving electrode Tx, the area of the first electrode group TG1 and the area of the second electrode group TG2 may not be substantially equal. However, in this case, too, in each sensor driving electrode Tx, it is desirable that the area of the first electrode group TG1 and the area of the second electrode group TG2 be substantially equal.

In the above-described embodiments, as the display device, liquid crystal display devices have been disclosed by way of example. However, the above-described embodiments are applicable to all kinds of flat-panel display devices, such as organic EL (electroluminescent) display devices, other self-luminous display devices, electronic paper-type display devices including electrophoresis elements, etc. Needless to say, the above-described embodiments are applicable to display devices ranging from small/middle-sized display devices to large-sized display devices, without particular restrictions.

What is claimed is:

1. A sensor-equipped display device comprising:
a display panel comprising a first electrode, a second electrode spaced apart from the first electrode and extending in parallel to the first electrode, and a detection electrode;
a first driver configured to deliver a common driving signal to the first electrode and the second electrode at a time of display driving for displaying an image, and to selectively write a write signal to one of the first electrode or the second electrode at a time of sensing driving for executing sensing;
a second driver configured to read, from the detection electrode, a read signal indicative of a variation of a sensor signal occurring between the one of the first electrode or the second electrode, on one hand, and the detection electrode, on the other hand, at the time of the sensing driving; and
a third driver,
wherein the display panel further comprises a lead line connected to the first driver, a first switching element connecting the lead line with the first electrode, and a second switching element connecting the lead line with the second electrode, and
the third driver is configured to change over the first switching element and the second switching element to a conductive state at the time of the display driving, and to selectively change over one of the first switching element or the second switching element to a conductive state and an opposing one of the first switching element or the second switching element to a non-conductive state at the time of the sensing driving.

2. The sensor-equipped display device of claim 1, wherein the first driver is configured to write the write signal to only the one of the first electrode or the second electrode at each time of the sensing driving.

3. The sensor-equipped display device of claim 2, wherein the first driver is configured to fix a potential of another of the first electrode or the second electrode than that of the first electrode or the second electrode to which the write signal is written at the time of the sensing driving.

4. The sensor-equipped display device of claim 1, wherein the first driver is configured to write the write signal to the first electrode in a first frame period, and to write the write signal to the second electrode in a second frame period following the first frame period.

5. The sensor-equipped display device of claim 1, wherein each of sensing periods, in which the sensing is executed, includes a first period and a second period, and
the first driver is configured to write the write signal to the first electrode in the first period, and to write the write signal to the second electrode in the second period.

6. The sensor-equipped display device of claim 1, wherein an area of the first electrode and an area of the second electrode are substantially equal.

7. The sensor-equipped display device of claim 1, wherein the first electrode and the second electrode extend in a first direction, and the detection electrode extends in a second direction crossing the first direction.

* * * * *